United States Patent
Lee et al.

(10) Patent No.: US 10,254,756 B2
(45) Date of Patent: Apr. 9, 2019

(54) CLEANING ROBOT AND METHOD FOR CONTROLLING THE SAME

(71) Applicant: SAMSUNG ELECTRONICS CO., LTD., Suwon-si, Gyeonggi-do (KR)

(72) Inventors: Dong Hun Lee, Ansan-si (KR); Heum yong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 15/491,422

(22) Filed: Apr. 19, 2017

(65) Prior Publication Data

US 2017/0220038 A1 Aug. 3, 2017

Related U.S. Application Data

(62) Division of application No. 15/014,843, filed on Feb. 3, 2016, now Pat. No. 9,658,616, which is a division
(Continued)

(30) Foreign Application Priority Data

Jun. 13, 2013 (KR) .................. 10-2013-0067587

(51) Int. Cl.
*G01C 21/00* (2006.01)
*G05D 1/00* (2006.01)
(Continued)

(52) U.S. Cl.
CPC ......... *G05D 1/0033* (2013.01); *G05D 1/0016* (2013.01); *G05D 1/0223* (2013.01);
(Continued)

(58) Field of Classification Search
CPC ............... G05D 1/0016; G05D 1/0033; G05D 2201/0203; G06F 3/00; Y10S 901/02
See application file for complete search history.

(56) References Cited

U.S. PATENT DOCUMENTS

2011/0001813 A1* 1/2011 Kim .................. G06K 9/00355
348/77
2011/0118877 A1* 5/2011 Hwang .................. B25J 13/00
700/264
(Continued)

FOREIGN PATENT DOCUMENTS

KR 10-1033726 5/2011
KR 10-2013-0040062 4/2013

OTHER PUBLICATIONS

International Search Report dated Sep. 18, 2014 in corresponding International Patent Application No. PCT/KR2014/005101.
(Continued)

*Primary Examiner* — Ian Jen
(74) *Attorney, Agent, or Firm* — Staas & Halsey LLP

(57) ABSTRACT

A cleaning robot including a main body, a moving assembly to move the main body, a cleaning tool provided at a bottom part of the main body to collect foreign substances on a floor, and an imager to collect images around the main body. The cleaning robot also including a controller to recognize motion of a hand by performing image processing of the collected images, identify a control command corresponding to the motion of the hand, plan a moving direction and a moving distance of the main body as movement information based on the control command, and control operations of the moving assembly and the cleaning tool based on the planned movement information. Since the user directly controls movement of the cleaning robot, it is possible to improve interactivity between human and cleaning robot, to reduce the effort by the user and increase convenience.

11 Claims, 22 Drawing Sheets

Related U.S. Application Data of application No. 14/282,482, filed on May 20, 2014, now Pat. No. 9,285,804.

(51) Int. Cl.

| | | |
|---|---|---|
| *G06F 3/00* | (2006.01) | |
| *G06F 3/01* | (2006.01) | |
| *G05D 1/02* | (2006.01) | |
| *G06T 7/246* | (2017.01) | |
| *G06K 9/00* | (2006.01) | |

(52) U.S. Cl.
CPC ............ *G05D 1/0246* (2013.01); *G06F 3/00* (2013.01); *G06F 3/017* (2013.01); *G06K 9/00375* (2013.01); *G06K 9/00664* (2013.01); *G06T 7/248* (2017.01); *G05D 2201/0203* (2013.01); *G06T 2207/30196* (2013.01); *G06T 2207/30204* (2013.01); *Y10S 901/02* (2013.01)

(56) References Cited

U.S. PATENT DOCUMENTS

| | | | |
|---|---|---|---|
| 2011/0138285 A1* | 6/2011 | Kuo | G06F 3/017 715/727 |
| 2013/0056032 A1 | 3/2013 | Choe et al. | |
| 2014/0371909 A1* | 12/2014 | Lee | G05D 1/0016 700/259 |

OTHER PUBLICATIONS

Extended European Search Report dated Dec. 16, 2015 in corresponding European Patent Application No. 14171609.2, 5 pages.
NPL: KPO English Translation: KR10-20130040062, Date: Apr. 23, 2013.
Australian Office Action dated Jul. 1, 2016 in corresponding Australian Patent Application No. 2014278987, 3 pages.
Australian Notice of Allowance dated Oct. 27, 2016 in corresponding Australian Patent Application No. 2014278987, 2 pages.
Supplemental Notice of Allowability dated Jan. 29, 2016 in related U.S. Appl. No. 14/282,482.
Notice of Allowance dated Nov. 4, 2015 in related U.S. Appl. No. 14/282,482.
Restriction Requirement dated Jul. 23, 2015 in related U.S. Appl. No. 14/282,482.
Supplemental Notice of Allowability dated Jan. 31, 2017 in related U.S. Appl. No. 15/014,843.
Notice of Allowance dated Jan. 18, 2017 in related U.S. Appl. No. 15/014,843.
Office Action dated Jun. 16, 2016 in related U.S. Appl. No. 15/014,843.
U.S. Appl. No. 14/282,482, filed May 20, 2014, Dong Hun Lee et al., Samsung Electronics Co., Ltd.
U.S. Appl. No. 15/014,843, filed Feb. 3, 2016, Dong Hun Lee et al., Samsung Electronics Co., Ltd.
European Communication dated Sep. 13, 2017 in European Patent Application No. 14171609.2.

* cited by examiner

FIG. 7
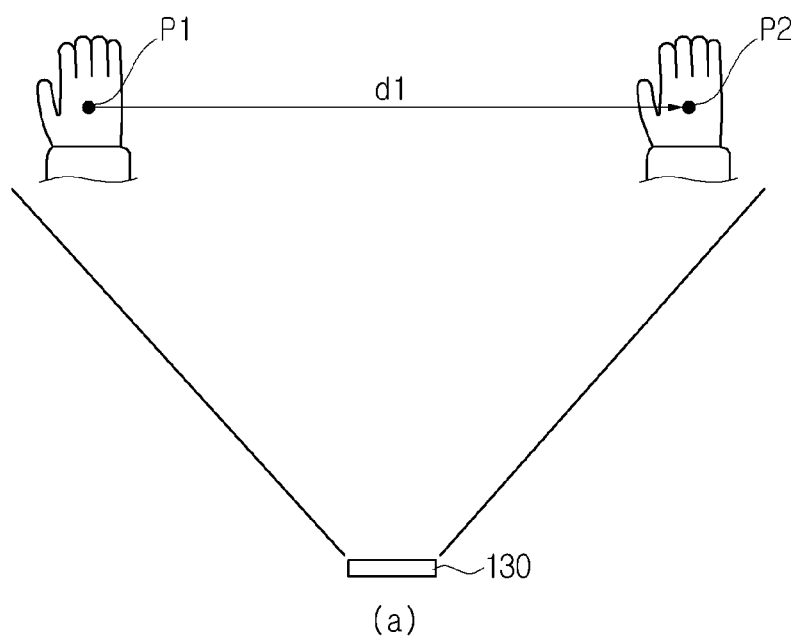
(a)
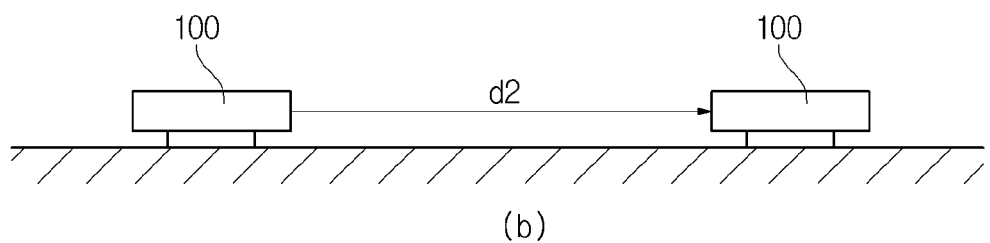
(b)

MOVING  STOPPING  DOCKING (a)　　　　　　　　　　(b)

CLEANING ROBOT AND METHOD FOR CONTROLLING THE SAME

CROSS-REFERENCE TO RELATED APPLICATIONS

This application is a divisional application of U.S. patent application Ser. No. 15/014,843, filed on Feb. 3, 2016, pending, which is a divisional application of U.S. patent application Ser. No. 14/282,482, filed on May 20, 2014, now U.S. Pat. No. 9,285,804, which claims the priority benefit of Korean Patent Application No. 10-2013-0067587, filed on Jun. 13, 2013 in the Korean Intellectual Property Office, the disclosures of which are incorporated herein by reference.

BACKGROUND

1. Field

One or more embodiments relate to a cleaning robot for reducing labor, increasing convenience and improving cleaning performance, and a method for controlling the same.

2. Description of the Related Art

As the industrial robot market has become saturated gradually since the 1990s, the intelligent service robot market is growing rapidly to provide robots imitating human judgment and action.

The intelligent service robots include human service robots, such as educational robots, personal robots and entertainment robots, which provide information delivery and emotional access to people, and home service robots, such as cleaning robots, security robots and pet care robots, which work on behalf of people at home.

Among them, a cleaning robot is a device which automatically cleans an area to be cleaned by suctioning foreign substances such as dust from the floor while autonomously traveling about a cleaning area without a user intervention, and reduces household labor hours.

The cleaning robot includes, as cleaning tools, a main cleaning tool to remove dust accumulated below a main body, and an auxiliary cleaning tool formed on both sides of the main body to protrude outward from the main body so as to clean a portion which is difficult to be cleaned by the main cleaning tool, e.g., an obstacle or a portion adjacent to the wall.

The cleaning robot repeatedly performs a cleaning operation by using the main cleaning tool and the auxiliary cleaning tool while traveling according to a preset traveling pattern. In this case, the cleaning robot performs cleaning while detecting an obstacle or wall located in the cleaning area through various sensors and the like, and controlling path movement and cleaning operations based on the detection results.

In the case of using this cleaning robot, the cleaning ability may be insufficient, it is impossible to recognize the user's intention, and it may be difficult to manipulate. Accordingly, there are many users who still prefer vacuum cleaners.

However, in the case of a general vacuum cleaner, since the user needs to move the cleaner, it requires a lot of labor of the user. In addition, in the case of the vacuum cleaner, as the suction power increases, the size and weight of the main body increase. This may result in an increase in the labor of the user during cleaning.

SUMMARY

The foregoing described problems may be overcome and/or other aspects may be achieved by one or more embodiments of a cleaning robot which moves while tracking a hand, and a method for controlling the same.

The foregoing described problems may be overcome and/or other aspects may be achieved by one or more embodiments of a cleaning robot which recognizes a hand in surrounding images and controls movement and an operation of a cleaning tool based on the position and shape of the recognized hand, and a method for controlling the same.

The foregoing described problems may be overcome and/or other aspects may be achieved by one or more embodiments of a cleaning robot which recognizes a marker in surrounding images and moves based on the position of the recognized marker, and a method for controlling the same.

The foregoing described problems may be overcome and/or other aspects may be achieved by one or more embodiments of a cleaning robot which sets a virtual wall and movement between positions based on the shape of the hand, and a method for controlling the same.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a cleaning robot may include a main body, a moving assembly to move the main body, a cleaning tool provided at a bottom part of the main body to collect foreign substances on a floor, an imager to collect images around the main body and a controller to recognize motion of a hand by performing image processing of the collected images, identify a control command corresponding to the motion of the hand, plan a moving direction and a moving distance of the main body as movement information based on the control command, and control operations of the moving assembly and the cleaning tool based on the planned movement information.

In accordance with one or more embodiments, a cleaning robot may include a main body, a moving assembly to move the main body, a cleaning tool provided at a bottom part of the main body to collect foreign substances on a floor, an imager to collect images around the main body, and a controller to recognize a marker in the collected images, identify a change in position of the marker, plan a moving direction and a moving distance of the main body as movement information based on the identified change in position, and control operations of the moving assembly and the cleaning tool based on the planned movement information.

In accordance with one or more embodiments, a cleaning robot may include a main body, a moving assembly to move the main body, a cleaning tool provided at a bottom part of the main body to collect foreign substances on a floor, a communicator to perform communication with an external imaging device, and a controller to recognize motion of a hand by performing image processing of images received in the communicator, identify a control command corresponding to the motion of the hand, plan a moving direction and a moving distance of the main body as movement information based on the control command, and control operations of the moving assembly and the cleaning tool based on the planned movement information.

In accordance with one or more embodiments, a cleaning robot may include a main body, a moving assembly to move the main body, an imager to collect images around the main body, and a controller to recognize a hand image in the collected images, plan a moving direction and a moving distance for tracking movement of the hand image as movement information, and control an operation of the moving assembly based on the planned movement information.

In accordance with one or more embodiments, a method for controlling a cleaning robot that may have a moving assembly and a cleaning tool provided at a bottom part of a main body may include identifying a cleaning mode, determining whether the identified cleaning mode is an interactive mode, collecting images around the main body by using an imager upon determining that the cleaning mode is the interactive mode, recognizing a hand image of a user in the collected images, recognizing motion of a hand in the recognized hand image, planning a moving direction and a moving distance of the main body as movement information based on the motion of the hand, and controlling operations of the moving assembly and the cleaning tool based on the planned movement information.

According to one or more embodiments, since the user may directly control movement of the cleaning robot, it may be possible to improve interactivity between a human and a cleaning robot, reduce the user's labor and increase convenience.

Since movement and operations may be controlled according to the user's intention by directly using a hand, it may be possible to improve intuitiveness and ease of manipulation.

Further, since cleaning may be performed selectively on a portion which has not been cleaned properly or a portion which the user desires to clean intensively, it may be possible to improve cleaning efficiency and user satisfaction.

Moreover, it may be possible to achieve fast and easy space movement by performing position movement based on the shape of the hand. Also, it may be possible to eliminate a beacon for setting up a virtual wall by setting up a virtual wall based on the shape of the hand, and the cost may be reduced.

BRIEF DESCRIPTION OF THE DRAWINGS

These and/or other aspects will become apparent and more readily appreciated from the following description of embodiments, taken in conjunction with the accompanying drawings of which:

FIGS. 7 and 8 are exemplary diagrams of movement control of a cleaning robot according to one or more embodiments;

DETAILED DESCRIPTION

Figure 1:
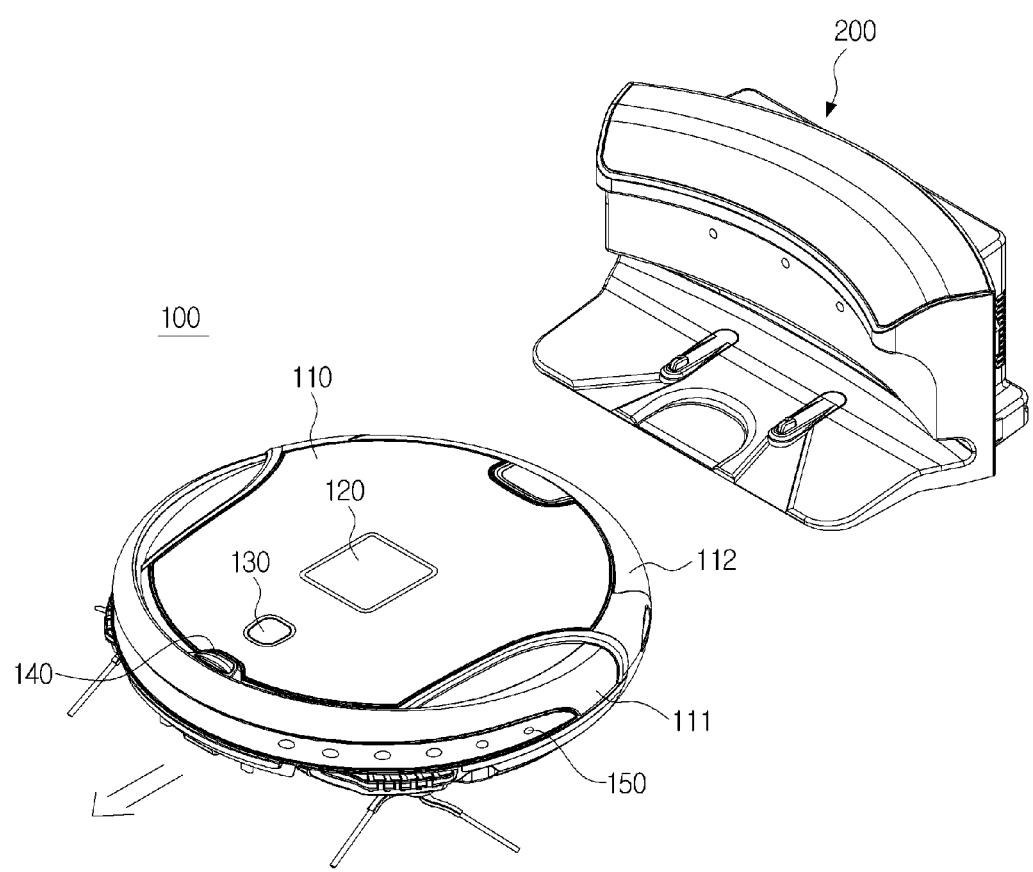
FIG. 1 is a top perspective view of a cleaning robot according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

A cleaning robot 100 may perform cleaning by suctioning foreign substances such as dust on the floor while autonomously traveling about a cleaning area when a cleaning command is input by a user, or at a cleaning reservation time, or while traveling through interaction with the user.

The cleaning robot 100 may perform cleaning while traveling based on a cleaning mode that may be selected by the user. Available modes may include an interactive mode and an automatic mode. In addition, the cleaning robot 100 may perform cleaning using only the interactive mode.

When a cleaning end command is input by the user, when it is determined that cleaning has been completed, or when remaining battery charge falls below a reference level, the cleaning robot 100 may perform charging by docking with a recharging base 200 and receiving power from the recharging base 200 once docking is completed.

In this case, the recharging base 200 may include a transformer that may be connected to an external commercial AC power source to possibly convert commercial AC power supplied from the external commercial AC power source, a rectifier to half-wave rectify or full-wave rectify the converted power, a smoothing unit to smooth the rectified power, and a voltage adjusting unit to output the smoothed power as DC power with a constant voltage. The recharging base 200 may supply the DC power output from the voltage adjusting unit to the cleaning robot 100 through a power terminal.

The recharging base 200 may further include a docking communicator (not shown) to transmit/receive a docking signal for docking with the cleaning robot 100 to/from the cleaning robot 100.

One or more embodiments will be described in conjunction with a cleaning robot which may perform cleaning in a cleaning mode selected by the user between the interactive mode and the automatic mode.

This cleaning robot will be described in detail with reference to FIGS. 1 and 2.

Figure 2:
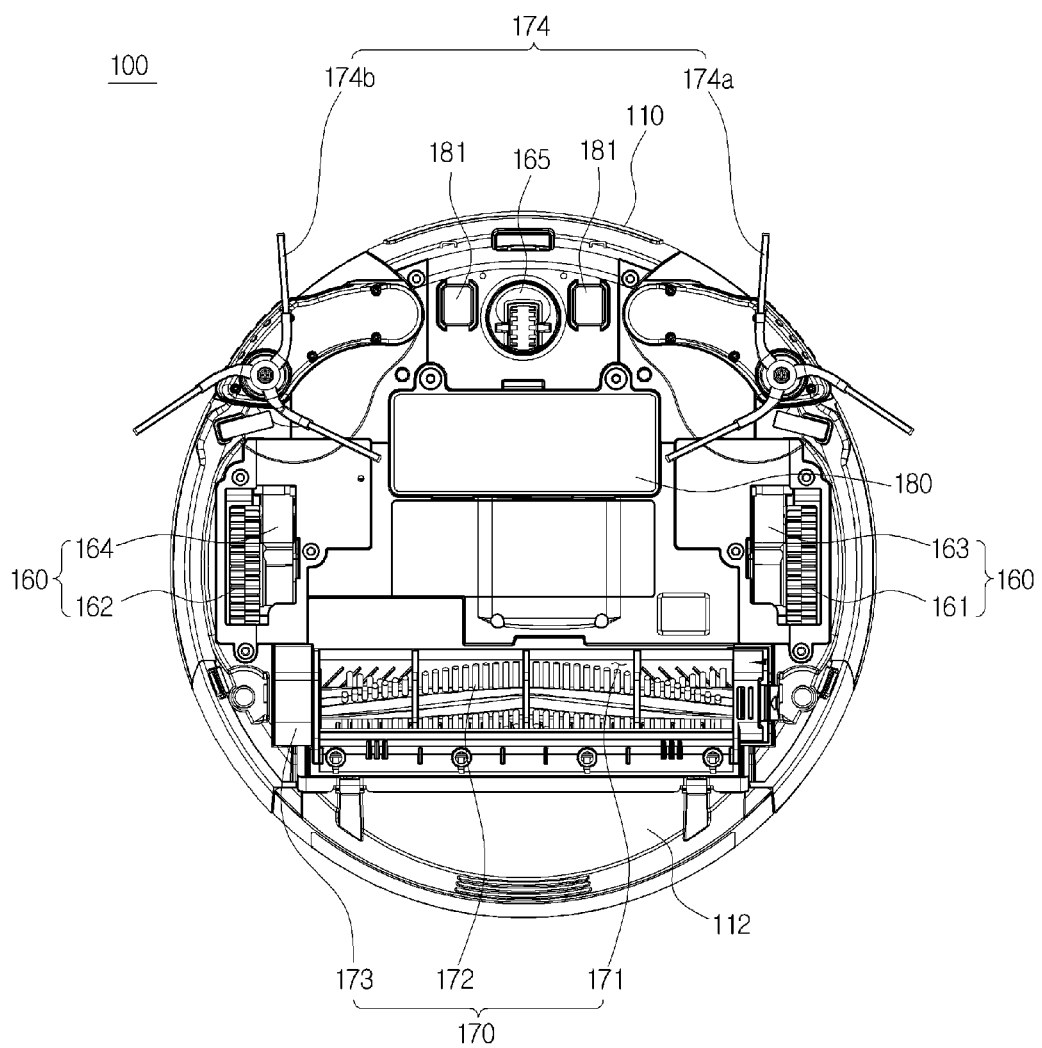
FIG. 2 is a bottom view of a cleaning robot according to one or more embodiments.

FIG. 1 is a top perspective view of a cleaning robot according to one or more embodiments, and FIG. 2 is a bottom view of a cleaning robot according to one or more embodiments.

As shown in FIG. 1, a cleaning robot 100 may include a main body 110 to form the outer appearance thereof, a bumper 111 that may be mounted on the front surface of the main body 110 to possibly mitigate impact upon collision with an obstacle, a user interface 120 that may be mounted on the upper part of the main body 110 to receive operation information and reservation information or the like and to display operating information, an imager 130 that may be integrally fixed and mounted on the upper part of the main body 110 to possibly collect images around the main body in the cleaning area, and a communicator 140 to perform communication with an external device such as the recharging base 200.

The bumper 111 may be further mounted on the rear surface of the main body 110.

The cleaning robot 100 may further include a dust collecting unit 112 that may be provided in the vicinity of a main cleaning tool 170 on the rear side of the main body 110 to collect foreign substances such as dust collected through the main cleaning tool 170.

The cleaning robot 100 may further include an obstacle detector 150 that may be mounted at the front, left side and/or right side surfaces of the main body 110 to possibly detect an obstacle located in the forward and/or lateral directions of the cleaning robot.

As shown in FIG. 2, the cleaning robot 100 may include a moving assembly 160 that may be installed at the bottom part of the main body 110 to move the main body 110, a cleaning tool 170 that may be installed at the bottom part of the main body 110 to sweep or scatter dust on the floor and suction the swept or scattered dust, and a power supply unit 180 to supply driving power to each component.

The moving assembly 160 may include a pair of wheels 161 and 162 that may be installed rotatably at the left and right edges of a central area of the main body 110 to possibly rotate and move the main body 110 forward or backward, wheel motors 163 and 164 to apply driving force to the wheels 161 and 162, and a caster wheel 165 that may be installed on the front side of the main body 110 to rotate depending on the state of the floor on which the cleaning robot 100 moves to change its angle.

In this case, the wheels 161 and 162 may be arranged on the main body 110 symmetrically with each other.

The caster wheel 165 may be utilized in posture stabilization and fall prevention of the cleaning robot 100 to support the cleaning robot 100 and may be formed of a roller or wheel having a caster shape.

The cleaning tool 170 and 174 may include a main brush assembly 170 that may be installed at the bottom part of the main body 110 to possibly sweep or agitate dust on the floor and suction the swept or agitated dust, and a side brush assembly 174 (174a and 174b) that may be installed at the bottom part of the main body 110 to be protrudable outward to possibly sweep dust in an area other than the area which is cleaned by the main brush assembly 170 and transfer the dust to the main brush assembly 170.

The main brush assembly 170 may include a main brush 172 that may be provided at a suction inlet 171 at the bottom part of the main body 110 to sweep or scatter dust on the floor below the main body 110, and a brush motor 173 to rotate the main brush 172.

In this case, the main brush 172 may include a roller mechanically connected to the brush motor 173, and a brush member mounted on the outer peripheral surface of the roller. That is, the roller of the main brush 172 may be rotated by driving the brush motor 173 to rotate the brush member mounted on the roller. In this case, the brush member of the main brush 172 may transfer dust on the floor to the suction inlet 171.

The cleaning robot 100 may collect foreign substances such as dust using suction force.

That is, the main brush assembly 170 may further include a suction portion provided inside the main body 110 around the main brush to generate suction force to be applied to the interior of the suction inlet 171.

In this case, the suction portion may include a blower. That is, the suction portion of the main brush assembly 170 may guide dust introduced into the suction inlet 171 to the dust collecting unit 112 by using air blowing force of the blower, and the air blowing force may be adjusted under the control of a controller.

The side brush assembly 174 may include a first side brush assembly 174a that may be located on the left side of the front surface of the main body 110 and a second side brush assembly 174b that may be located on the right side of the front surface of the main body 110 to sweep dust on the floor in the forward and lateral directions of the main body 110 and dust on the floor which may not be swept by the main brush 172 toward the suction inlet 171 to possibly improve cleaning efficiency.

The first and second side brush assemblies 174a and 174b on the left and right sides may include bodies detachably mounted on the main body 110, side arms rotatably mounted on the bodies to be protrudable outward from the main body 110, and side brushes rotatably mounted on the side arms that are protrudable outward from the main body 110.

In addition, the first and second side brush assemblies 174a and 174b may include only side brushes rotatably mounted on the left and right sides of the front surface of the main body 110.

The power supply unit 180 may include a battery which may be electrically connected to various components that may be mounted on the main body 110 to possibly supply driving power to various components.

In this case, the battery may be a rechargeable secondary battery, which may be electrically connected to the recharging base 200 through two charging terminals 181 and may receive may receive power from the recharging base 200 to possibly perform charging.

The cleaning robot 100 may not only perform cleaning while automatically traveling about a cleaning area based on an obstacle detection signal detected by the obstacle detector 150 or the like, but may also perform cleaning while traveling about a cleaning area to possibly reflect the intention of the user.

That is, when performing cleaning in an automatic mode, the cleaning robot 100 may detect an obstacle such as furniture, office equipment and walls installed in the cleaning area and a distance to the obstacle through the obstacle detector 150, and may clean the cleaning area while autonomously changing direction by driving the wheels 161 and 162 of the moving assembly 160 according to the detection result.

On the other hand, when performing cleaning in the interactive mode, the cleaning robot 100 may perform cleaning based on, e.g., a change in position of a marker, or motion of a hand in which the user's intention may be reflected. In this case, the motion of the hand may include a change in position of the hand, a shape of the hand and the like.

Figure 3A:
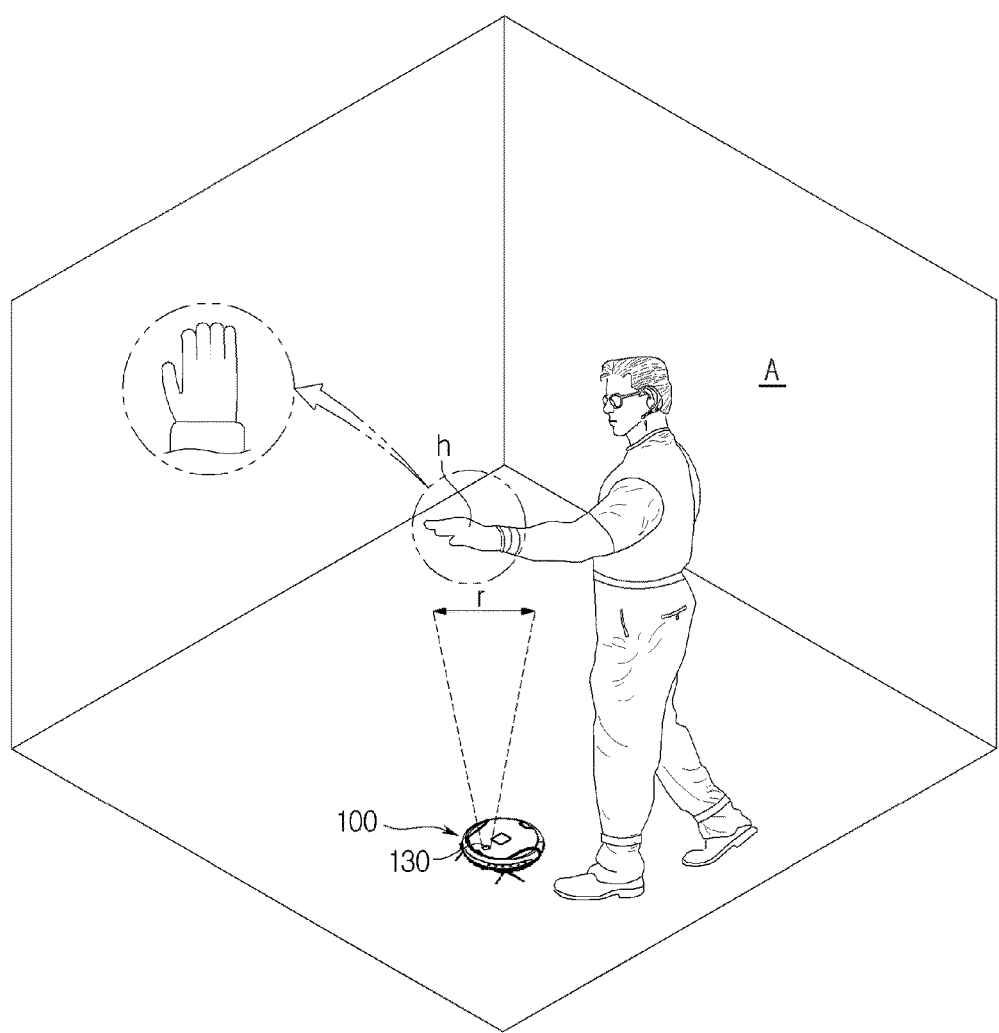
FIGS. 3A and 3B are exemplary diagrams of image recognition for recognizing a control command of a cleaning robot according to one or more embodiments.

Referring to FIG. 3A, in the case where the user intends to clean a cleaning area A through interaction with the cleaning robot, the user may input the interactive mode to the user interface 120 of the cleaning robot.

Then, the user may place a hand h around the imager 130 that may be provided in the cleaning robot 100, i.e., in a photographing range r of the imager 130, and may move the hand h to a desired position within the photographing range r.

When the interactive mode is input to the user interface 120, the cleaning robot 100 may operate the imager 130 to collect images around the main body 110, may recognize a hand image corresponding to the hand h of the user among the collected images, may determine a change in position of the recognized hand image, and may perform cleaning while moving based on the determined change in position.

That is, the cleaning robot 100 may move while tracking the hand h of the user.

When the cleaning robot 100 moves while tracking the user's hand, the position of the main body may change with the position of the hand. In this case, the photographing range r of the imager 130 may also change. Thus, the cleaning robot 100 may continuously collect images for the user's hand.

If it is determined that an image corresponding to the user's hand is not obtained, the cleaning robot 100 may output a beep sound.

Figure 3B:
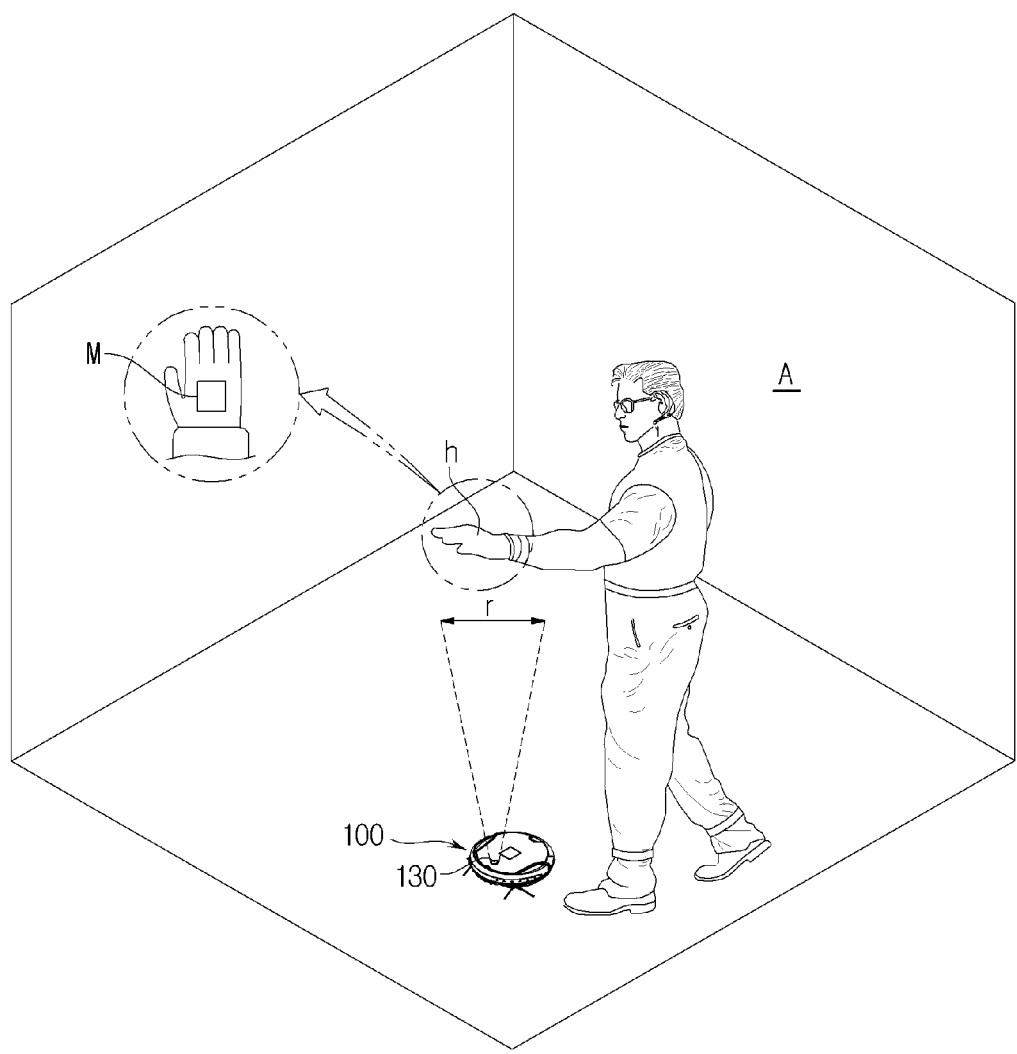

In addition, as shown in FIG. 3B, the cleaning robot may recognize a marker M attached to the hand h. That is, the cleaning robot may recognize the position of the marker moving over time, may determine a change in the recognized position of the marker and then may move the main body based on the determined change in position.

In this case, the cleaning robot may recognize the shape of the hand, and control an operation such as stopping or docking based on the recognized shape of the hand.

A control configuration of the cleaning robot will be described with reference to FIG. 4.

Figure 4:
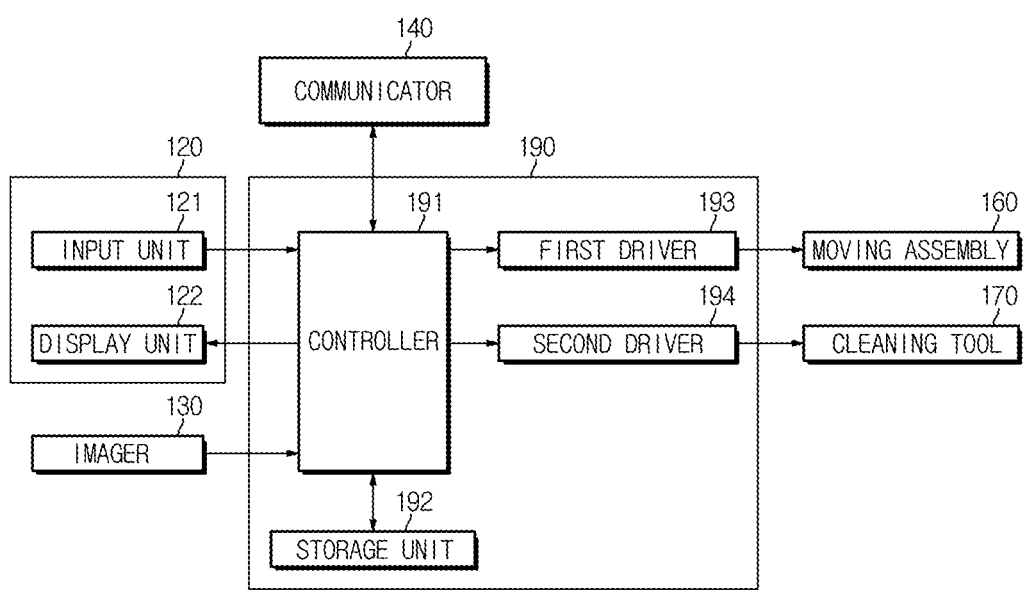
FIG. 4 is a control block diagram of a cleaning robot according to one or more embodiments.

FIG. 4 shows a control block diagram of a cleaning robot according to one or more embodiments. The cleaning robot may include a user interface 120, the imager 130, a communicator 140 and a drive module 190.

The user interface 120 may receive a command from the user, and may display an operation state and the like.

The user interface 120 may include an input unit 121 to receive cleaning reservation information, cleaning start/end, an operation mode, a traveling pattern and the like, and a display unit 122 to display cleaning reservation information, a charging state, a dust collecting state, a traveling pattern, an operation mode and the like.

In this case, the operation mode may include a cleaning mode having an automatic mode and an interactive mode, a standby mode, a docking mode and the like.

The user interface 120 may be implemented, for example, as a touchscreen.

In this case, a power on-off button of the user interface may be a button provided separately from the touchscreen.

Figure 5:
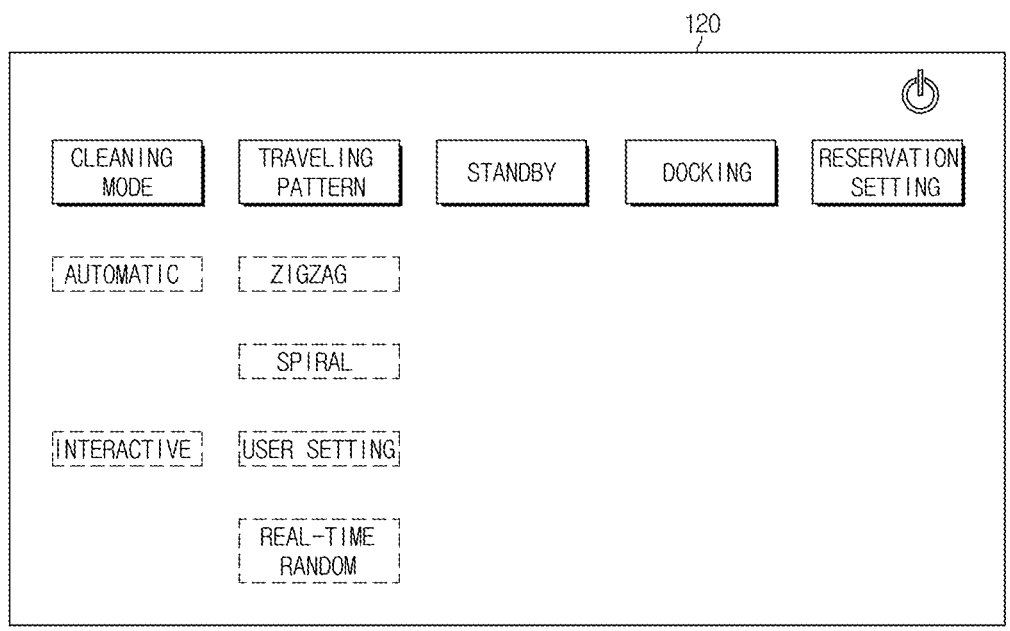
FIG. 5 is an exemplary diagram of a user interface provided in a cleaning robot according to one or more embodiments.

Referring to FIG. 5, for example, the user interface 120 may include a power button, and may display, for example, a cleaning mode, a traveling pattern, a standby mode, a docking mode, reservation setting and the like as information that may be selected. This information may be selected by touch input.

If the cleaning mode is selected by the user, the user interface 120 of the cleaning robot may display the automatic mode and the interactive mode included in the cleaning mode as buttons. If the automatic mode is selected by the user, the cleaning robot may display the traveling pattern. In this case, traveling patterns that may be used in the automatic mode may be displayed.

For example, if the automatic mode is selected, the user interface 120 may display, for example, a zigzag pattern and a spiral pattern as traveling patterns that may be used in the automatic mode.

If the interactive mode is selected by the user, the user interface 120 of the cleaning robot may display the traveling pattern. In this case, traveling patterns that may be used in the interactive mode may be displayed.

For example, if the interactive mode is selected, the user interface 120 may display, for example, a user setting pattern and a real-time random pattern as traveling patterns that may be used in the interactive mode.

In this case, if the user setting pattern is selected, the cleaning robot may recognize the traveling pattern which is set by the user by tracking movement of the user's hand using images collected by the imager.

In this case, the real-time random pattern may mean traveling while tracking the user's hand in real time.

A "Standby" button may instruct a standby operation during cleaning, a "docking" button may instruct a docking operation during cleaning, and a "reservation setting" button may be for cleaning reservation. If a button for reservation setting is selected, the user interface may display a reservation input window.

If the traveling pattern is not selected by the user, the cleaning robot may travel according to a preset traveling pattern or at random.

In addition, the input unit of the user interface may be implemented, for example, as a touchpad, and the display unit of the user interface may be implemented, for example, as a liquid crystal display (LCD).

The imager 130 may collect images around the main body 110. In this case, the photographing direction of the imager 130 may be an upward direction opposite to a direction toward the floor.

The imager 130 may include, for example, a two-dimensional camera, a three-dimensional camera, an infrared camera or the like.

The imager 130 may collect images around the main body to obtain a control command when the cleaning mode is the interactive mode, and may collect images around the main body to detect an obstacle and position information of the main body when the cleaning mode is the automatic mode.

That is, images collected when the cleaning mode is the interactive mode may be used to recognize the control command corresponding to the intention of the user, and images collected when the cleaning mode is the automatic mode may be used to recognize the position of the cleaning robot.

The communicator 140 may perform communication with the recharging base 200 in the docking mode, and may perform, for example, at least one of radio frequency (RF) communication, infrared communication and ultrasonic communication.

Further, the communicator 140 may perform communication with a remote control (not shown) for manipulating the operation of the cleaning robot.

The cleaning robot 100 may include the obstacle detector 150 mounted on the main body 110 to detect an obstacle in the cleaning area.

The cleaning robot 100 may generate a map by using information about images collected by the imager 130 and detection information of an obstacle detected by the obstacle detector 150, and may perform traveling by using the map generated in the automatic mode.

The drive module 190 may drive the user interface 120 for input and output of information and the imager 130 for an image collecting operation, and may drive the moving assembly 160 and the cleaning tool 170 based on information input to the user interface and images collected by the imager. The drive module 190 may include a controller 191, a storage unit 192 and a plurality of drivers 193 and 194.

The controller 191 may control operations of the moving assembly 160 and the cleaning tool 170 based on images collected by the imager 130 and an obstacle detection surface detected by the obstacle detector 150 upon determining that the cleaning mode input to the user interface 120 is the automatic mode.

The controller 191 may control the moving assembly to perform traveling in the traveling pattern input to the user interface 120 when cleaning is performed in the automatic mode. In this case, the cleaning robot may travel at random, or in a traveling pattern input through the user interface 120.

The controller 191 may control the moving assembly to perform traveling while performing interaction with the user when cleaning is performed in the interactive mode. In this case, the cleaning robot may travel in the traveling pattern corresponding to the movement of the hand in the hand images collected by the imager 130, or travel while tracking the user's hand in real time.

When recognizing the traveling pattern by the user setting, the controller 191 may determine the positions of the hand at predetermined time intervals and may recognize the traveling pattern by connecting the determined positions.

That is, upon determining that the cleaning mode input to the user interface 120 is the interactive mode, the controller 191 may control the operations of the moving assembly 160 and the cleaning tool 170 based on the images collected by the imager 130.

In this case, the controller 191 may perform image processing of the images collected by the imager 130 to acquire a hand image, and may recognize motion of the acquired hand image. In this case, the motion may include the position of the hand and the shape of the hand.

Figure 6:
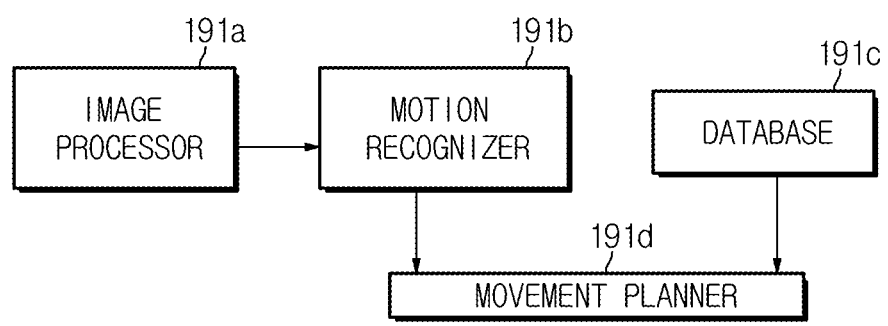
FIG. 6 is a detailed block diagram of a controller of a cleaning robot according to one or more embodiments.

As shown in FIG. 6, the controller 191 may include an image processor 191a for recognizing an image, a motion recognizer 191b, a database 191c, and a movement planner 191d.

The image processor 191a may perform image processing of the collected images, and may recognize a hand image corresponding to the user's hand in the collected images.

The motion recognizer 191b may recognize a palm portion in the hand image, may select any one point on the palm, and may recognize a change in position of the selected point.

The motion recognizer 191b may recognize a palm portion in the hand image, may select any one point on the palm, and may recognize the position of the selected point. Further, the motion recognizer 191b may compare a previous position with a current position, and may calculate a change in position.

In this case, the any one point on the palm may be, for example, a center point of the palm.

The current position may be the position of the center point of the palm in the currently collected images, and the previous position may be the position of the center point of the palm in the images collected before a certain period of time from the present.

Further, the motion recognizer 191b may recognize the shape of the hand based on the hand image.

In this case, the motion recognizer 191b may generate may generate image information corresponding to the shape of the hand.

For example, the motion recognizer 191b may generate feature point information or edge information through a process of finding a feature point or an edge in the hand image.

The database 191c may store information about a plurality of reference images corresponding to a plurality of shapes of the hand respectively, and may store information about control commands corresponding to the plurality of reference images respectively.

For example, the database 191c may store information about reference images corresponding to rock-paper-scissors in the cases of clenching a fist, spreading five fingers and unfolding only two fingers and the like, and may store a traveling command corresponding to the shape of "paper" and a stop command corresponding to the shape of "rock" and the like.

The movement planner 191d may plan movement based on the position change information and the image information of the hand image in the motion recognizer 191b.

The movement planner 191d may recognize the shape of the hand in the currently collected hand images by comparing the image information of the hand shape generated by the motion recognizer 191b with the information about reference images corresponding to shapes stored in the database 191c, and may identify a control command corresponding to the recognized shape of the hand.

Further, if the recognized shape of the hand is a shape corresponding to the traveling command, the movement planner 191d may identify a change in position of the hand, and may plan operation of the moving assembly to move the cleaning robot in a direction and by a distance corresponding to the identified change in position.

That is, the controller 191 may identify the moving distance and the moving direction corresponding to the change in position of the hand, and may control driving of the wheel motors 163 and 164 based on the identified moving distance and moving direction.

As shown in (a) of FIG. 7, the controller 191 may store the position of a previous center point P1, and may identify the position of a current center point P2 after a predetermined period of time has elapsed.

The controller 191 may calculate a change in position by comparing the position of the previous center point P1 with the position of the current center point P2, and may determine a moving distance d1 of the hand h based on the calculated change in position.

As shown in (b) of FIG. 7, the controller 191 may control driving of the wheel motors to move the main body by a distance d2 corresponding to the moving distance d1 of the hand h.

In addition, the controller 191 may calculate a moving speed of the hand based on the time and distance when the position is changed from the position of the previous center point to the position of the current center point, and may control a moving speed of the moving assembly based on the calculated moving speed.

For example, if the moving speed of the hand increases from V1 to V2, the controller 191 controls driving of the wheel motors such that the moving speed of the main body also increases from V1 to V2.

Figure 8:
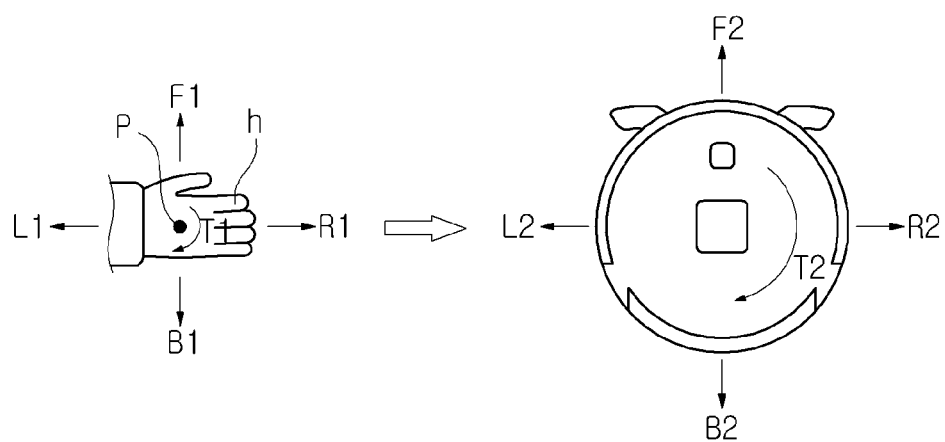

As shown in FIG. 8, the controller 191 may recognize any one center point P on the palm of the user's hand h, may determine a direction in which the center point P moves, and may drive the wheel motors to move the main body in the determined direction.

For example, the controller 191 may move the main body forward (F2) if the center point moves forward (F1), may move the main body backward (B2) if the center point moves backward (B1), and may rotate the main body (T2) if the center point rotates (T1).

In addition, in the case where the cleaning robot is movable to the left and right through rotation of the wheels, the controller 191 may move the main body to the right (R2) if the center point moves to the right (R1), and may move the main body to the left (L2) if the center point moves to the left (L1), The controller 191 may recognize the shape of the hand, may control a moving, standby, or docking operation corresponding to the recognized shape, and may control a mode change.

Figure 9:
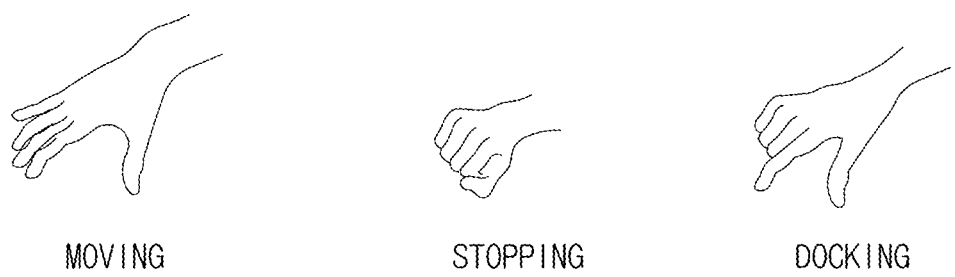
FIG. 9 is an exemplary diagram of operation control of a cleaning robot according to one or more embodiments.

Referring to FIG. 9, for example, if the recognized shape of the hand is a shape in the case of spreading five fingers, the controller 191 may control driving of the wheel motors and the brush motor to move the main body to perform cleaning. If the recognized shape of the hand is a shape in the case of clenching a fist, the controller 191 may halt driving of the wheel motors and the brush motor to stop the main body. If the recognized shape of the hand is a shape in the case of unfolding only two fingers, the controller 191 may control driving of the wheel motors and may halt driving of the brush motor to perform docking.

In addition, if a shape when spreading and bending fingers is repeated within a preset period of time, the controller 191 may perform mode change control. In this case, the mode change may include a change from the automatic mode to the interactive mode and a change from the interactive mode to the automatic mode.

That is, if the hand is recognized by the imager while cleaning is performed in the automatic mode, the controller 191 may determine whether the recognized shape of the hand is a shape for mode change, and may change the cleaning mode from the automatic mode to the interactive mode upon determining that the recognized shape is a shape for mode change.

Further, if the shape of the hand for mode change is recognized by the imager while cleaning is performed in the interactive mode, the controller 191 may change the cleaning mode to the automatic mode.

Further, if the hand is not recognized by the imager while cleaning is performed in the interactive mode, the controller 191 may halt operations of the moving assembly and the cleaning tool to stop moving and cleaning operations, and may control output of a beep sound indicating that the hand is not recognized.

In addition, if a predetermined time has elapsed after a beep sound is output, the controller 191 may change the cleaning mode to the automatic mode.

The storage unit 192 may store the moving distance of the cleaning robot according to the moving distance of the hand.

In this case, the moving distance of the hand to the moving distance of the robot may be set, for example, to 1:1.

The storage unit 192 may store a predetermined time for calculating a change in position and the like.

A first driver 193 may drive the wheel motors 163 and 164 of the moving assembly based on the command of the controller 191. In this case, the main body 110 may be rotated by setting the rotational speeds of the left and right wheel motors 163 and 164 to different values.

A second driver 194 may drive the brush motor 173 of the cleaning tool 170 based on the command of the controller 191.

Figure 10:
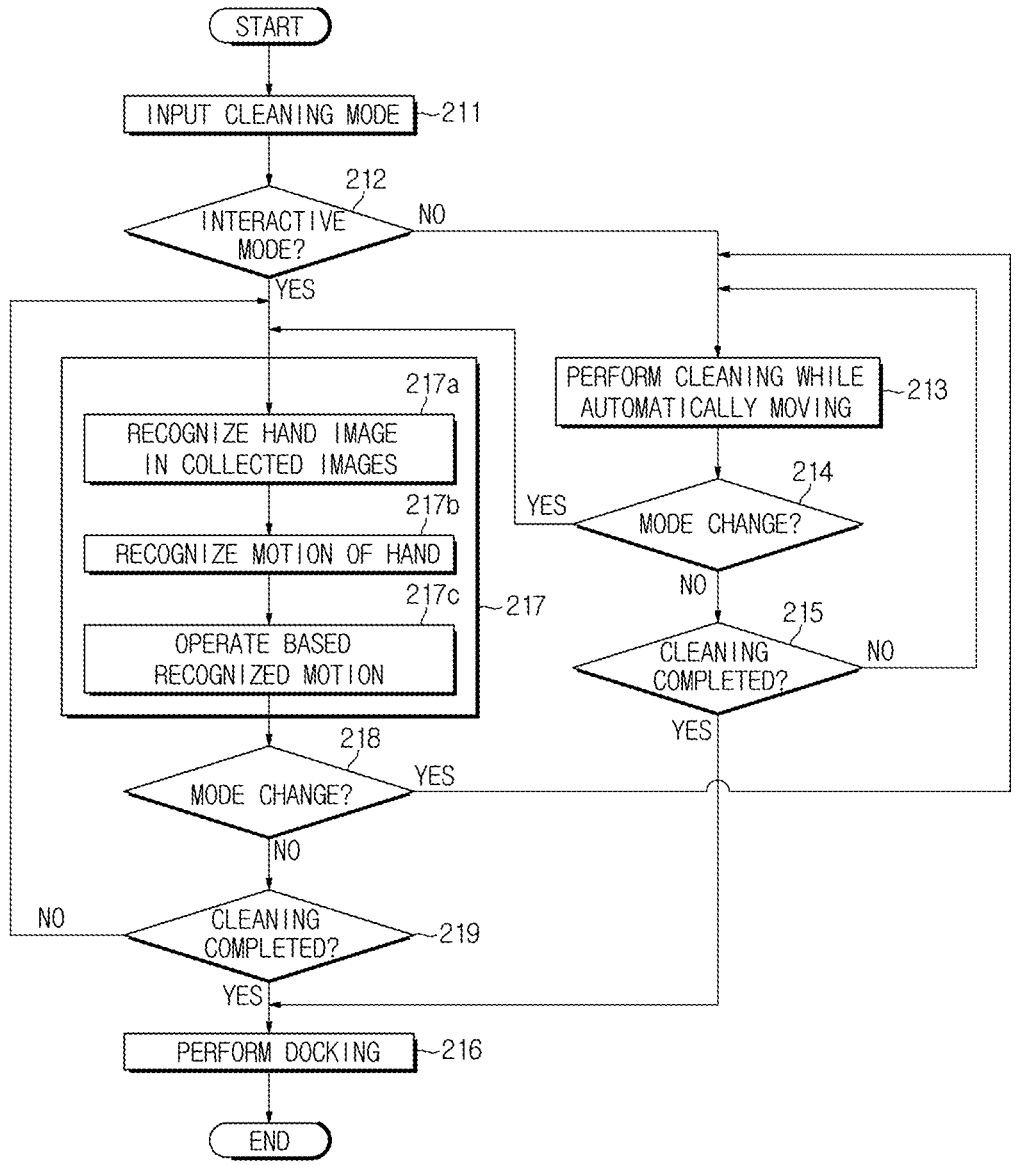
FIG. 10 is a control flowchart of a cleaning robot according to one or more embodiments.

FIG. 10 is a control flowchart of the cleaning robot according to one or more embodiments.

The cleaning robot may activate the display unit of the user interface when powered on.

The cleaning robot may receive a cleaning mode through the input unit of the user interface (operation 211).

The cleaning robot may determine whether the input cleaning mode is the interactive mode (operation 212). In this case, if the input cleaning mode is the automatic mode, the cleaning robot may perform cleaning while automatically moving about the cleaning area by driving the wheels and rotating the main brush based on an obstacle detection signal detected by the obstacle detector 150 (operation 213).

In this case, the cleaning robot may travel using preset map information, or may travel in a traveling pattern selected by the user. In addition, the cleaning robot may travel in a random manner.

The cleaning robot may determine whether a command for mode change has been input while moving about the cleaning area in the automatic mode (operation 214), and may determine whether cleaning has been completed upon determining that a command for mode change has not been input (operation 215). The cleaning robot may perform cleaning while automatically moving until completion of cleaning is determined, and may perform docking upon determining that cleaning has been completed (operation 216).

In this case, determining whether a command for mode change has been input may include determining whether the user's hand is recognized by the imager 130 while performing cleaning of the cleaning area, and determining that a command for changing the cleaning mode from the automatic mode to the interactive mode has been input upon determining that the user's hand has been recognized by the imager 130.

In this case, the cleaning robot may determine whether the shape of the user's hand recognized by the imager 130 is a shape instructing mode change. Upon determining that the recognized shape of the user's hand is a shape instructing mode change, the cleaning robot may perform mode change.

In addition, determining whether a command for mode change has been input further may include determining whether the interactive mode has been input to the user interface 120 during cleaning in the automatic mode, and determining that a command for changing the cleaning mode from the automatic mode to the interactive mode has been input upon determining that the interactive mode has been input to the user interface.

When the interactive mode has been input through the user interface, or the cleaning mode is changed from the automatic mode to the interactive mode, the cleaning robot may perform cleaning while moving based on the images collected by the imager 130 (operation 217).

This will be described in more detail.

When the interactive mode has been input through the user interface 120, the cleaning robot may display the traveling patterns that may be used in the interactive mode.

When the user setting pattern is selected by the user, the cleaning robot may determine whether the user's hand is recognized by the imager. In this case, the cleaning robot may instruct the user to set a traveling pattern through sound or text.

Upon determining that the user's hand is recognized by the imager 130, the cleaning robot may track the movement of the hand. In this case, the position of the hand may be recognized at predetermined time intervals, and the traveling pattern may be set by connecting the positions recognized at predetermined time intervals.

Figure 11:
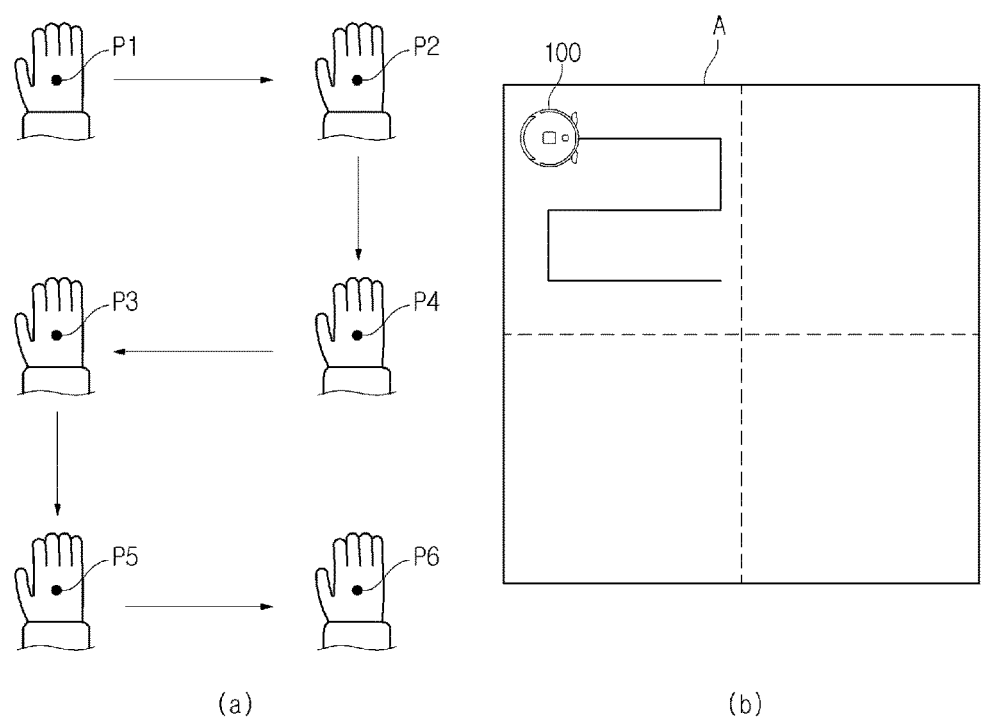
FIG. 11 is an exemplary diagram of traveling pattern setting of a cleaning robot according to one or more embodiments.

Referring to FIG. 11, for example, the cleaning robot may recognize any one point on the palm of the hand h of the user as the center point P. Then, information about the position of the center point may be stored.

When a first center point P1 is stopped after moving, the cleaning robot may determine the stopped position, and may set the position as a second center point P2. When the second center point P2 is stopped after moving, the cleaning robot may determine the stopped position, and may set the position as a third center point P3.

When the third center point P3 is stopped after moving, the cleaning robot may determine the stopped position, and may set the position as a fourth center point P4. When the fourth center point P4 is stopped after moving, the cleaning robot may determine the stopped position, and may set the position as a fifth center point P5. When the fifth center point P5 is stopped after moving, the cleaning robot may determine the stopped position, and may set the position as a sixth center point P6.

If the center point no longer moves after the sixth center point is recognized, or the hand is not recognized in the images collected by the imager, the cleaning robot may determine that traveling pattern setting has been completed, and may set the traveling pattern by sequentially connecting the first center point to the sixth center point.

In this case, when setting the center point, the position at the time point of stopping may have been set as the position of the center point. However, the center point may be recognized at predetermined time intervals and the recognized center point may be set as a moving position.

The cleaning robot may store the set traveling pattern, and may perform cleaning while moving about the cleaning area based on the stored traveling pattern. In this case, the cleaning robot may perform cleaning while moving on a basis of a cell having a preset size.

If the real-time random pattern is selected by the user in a state in which the interactive mode is selected, the cleaning robot may recognize the user's hand in real time through the imager 130, and may perform cleaning while tracking the recognized hand.

That is, the cleaning robot may recognize the hand image corresponding to the user's hand in the collected images by performing image processing of the collected images (operation 217a), may recognize motion of the recognized hand image (operation 217b), and may operate based on the recognized motion (operation 217c).

In this case, the motion of the hand may include the shape of the hand and the position of the hand.

A configuration in which the cleaning robot operates based on the motion of the hand will be described in more detail.

The cleaning robot may recognize the shape of the hand based on the hand image, and may generate image information corresponding to the shape of the hand.

Then, the cleaning robot may compare the generated image information of the shape of the hand with the information about reference images corresponding to shapes stored in the database 191c, may recognize the shape of the hand in the currently collected hand images, and may identify a control command corresponding to the recognized shape of the hand.

The cleaning robot may determine a control command corresponding to the recognized shape of the hand, and may control at least one of the wheel motors and the brush motor corresponding to the determined control command. In this case, if it is determined that the determined control command is a traveling command, the cleaning robot may determine a change in position of the hand.

That is, the cleaning robot may recognize a palm portion in the recognized hand image, may select any one point on the palm, and may calculate a change in position of the selected point. In this case, any one point on the palm is the center point of the palm.

That is, the cleaning robot may calculate a change in position by comparing the position of the previous center point with the position of the current center point recognized at the time point after a predetermined time has elapsed from the time point when the previous center point has been recognized.

Figure 12:
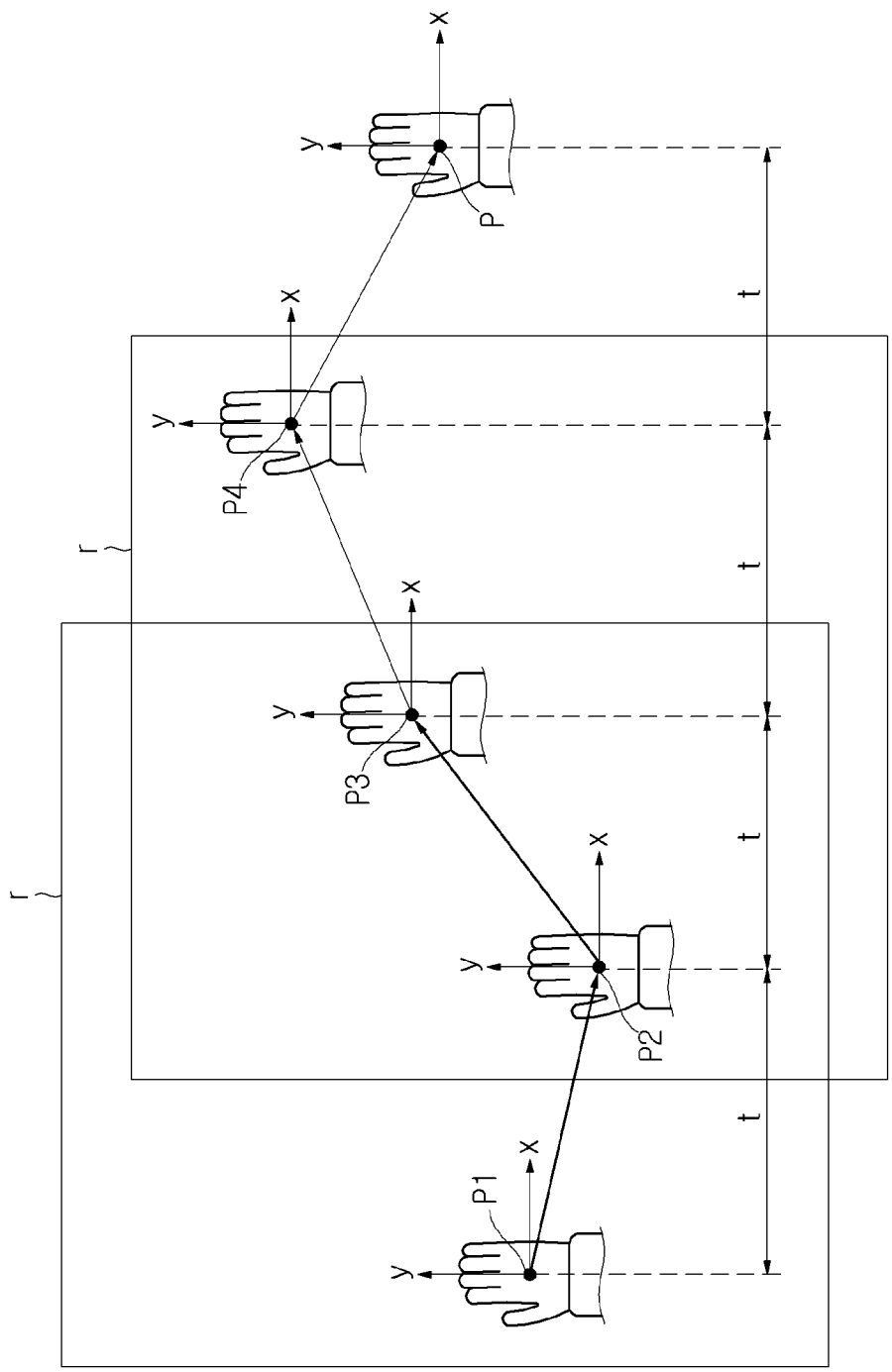
FIGS. 12 and 13 are exemplary diagrams of movement control of a cleaning robot according to one or more embodiments.

Referring to FIG. 12, the cleaning robot may recognize the second center point P2 at the time point after a predetermined time t has elapsed from the time point when the first center point P1 has been recognized. Then, the cleaning robot may calculate a change in position from the first center point P1 to the second center point P2, and may move in a direction and by a distance corresponding to the calculated change in position.

Further, the cleaning robot may recognize the third center point P3 at the time point after a predetermined time t has elapsed from the time point when the second center point P2 has been recognized. Then, the cleaning robot may calculate a change in position from the second center point P2 to the third center point P3, and may move in a direction and by a distance corresponding to the calculated change in position.

Further, the cleaning robot may recognize the fourth center point P4 at the time point after a predetermined time t has elapsed from the time point when the third center point P3 has been recognized. Then, the cleaning robot may calculate a change in position from the third center point P3 to the fourth center point P4, and may move in a direction and by a distance corresponding to the calculated change in position.

In this case, the predetermined time may be set such that two center points adjacent to each other, for example, the first center point and the second center point, the second center point and the third center point, or the third center point and the fourth center point, are included in one photographing range.

The cleaning robot may identify a moving distance and a moving direction corresponding to a change in position of the hand, and may move by the identified moving distance and in the identified moving direction.

In this case, the cleaning robot may move the main body by the distance d2 corresponding to the moving distance d1 of the hand h, and may move the main body in the moving direction of the hand.

Further, the cleaning robot may control the moving speed of the main body based on the moving speed of the hand. For example, the cleaning robot may control driving of the wheel motors such that the moving speed of the main body increases from V1 to V2 when the moving speed of the hand increases from V1 to V2.

Thus, the cleaning robot may perform cleaning while moving about the cleaning area according to the movement of the user's hand.

Accordingly, the cleaning robot may perform focused cleaning according to the intention of the user at a place where the user desires focused cleaning.

Figure 13:
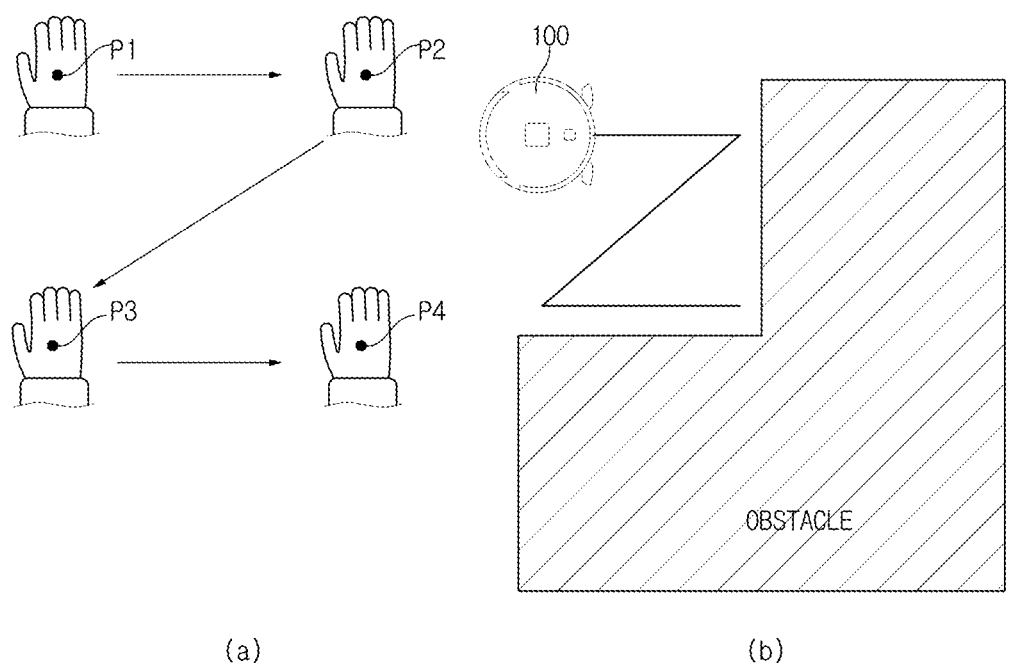

Referring to FIG. 13, for example, if the user intends to perform focused cleaning at a corner of the obstacle, the user may reciprocate the hand, so that the cleaning robot may perform reciprocating traveling at the corner.

The cleaning robot may continuously recognize the shape of the hand while performing cleaning in the interactive mode. Then, the cleaning robot may perform a moving, standby or docking operation, or may change the cleaning mode in response to the recognized shape.

That is, the cleaning robot may recognize the shape of the hand based on the hand image, and may generate image information corresponding to the shape of the hand.

Then, the cleaning robot may recognize the shape of the hand in the currently collected hand images by comparing the generated image information of the shape of the hand with the information about reference images corresponding to shapes stored in the database 191c, may identify a control command corresponding to the recognized shape of the hand, and may perform an operation corresponding to the identified control command.

For example, if the recognized shape of the hand is a shape in the case of spreading five fingers, the cleaning robot may drive the wheel motors and the brush motor to move the main body to perform cleaning. If the recognized shape of the hand is a shape in the case of clenching a fist, the cleaning robot may halt driving of the wheel motors and the brush motor to stop the main body. If the recognized shape of the hand is a shape in the case of unfolding only two fingers, the cleaning robot may drive the wheel motors and may halt driving of the brush motor to perform docking.

In addition, if a shape when spreading and bending fingers is repeated within a preset period of time, the cleaning robot may change the cleaning mode from the interactive mode to the automatic mode.

If the hand is not recognized in the images collected by the imager 130 while cleaning is performed in the interactive mode, the cleaning robot may stop the operations of the moving assembly and the cleaning tool to stop moving and cleaning operations, and may output a beep sound indicating that the hand is not recognized.

In addition, if a predetermined time has elapsed after a beep sound is output, the cleaning robot may change the cleaning mode to the automatic mode.

The cleaning robot may determine whether a command for mode change has been input during cleaning in the interactive mode (operation 218), may perform cleaning in the automatic mode upon determining that a command for mode change has been input, and may determine whether cleaning has been completed upon determining that a command for mode change has not been input (operation 219). The cleaning robot may perform cleaning while tracking the user's hand until it is determined that cleaning has been completed.

In this case, determining whether a command for mode change has been input may include determining whether the shape of the hand is a shape for mode change, and determining that the automatic mode has been input through the user interface, or the hand has not been recognized by the imager for a certain period of time.

If a cleaning end command or a docking command is input through the user interface, the cleaning robot may perform docking with the recharging base (operation 216), and may perform charging once docking is completed.

In addition, the cleaning robot may perform docking with the recharging base through tracking of the user's hand.

Figure 14:
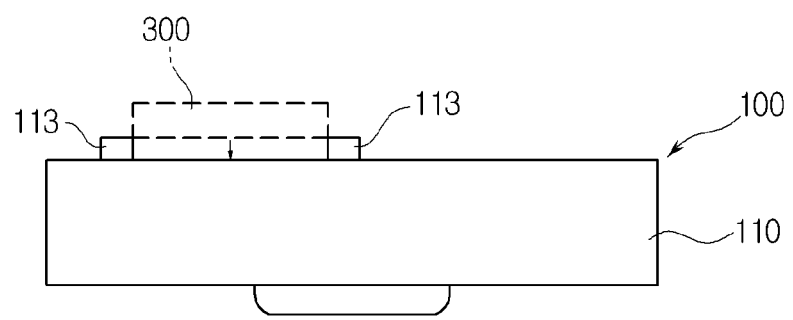
FIG. 14 is an exemplary diagram of a cleaning robot according to one or more embodiments.

FIG. 14 is an exemplary diagram of a cleaning robot according to one or more embodiments.

A cleaning robot 100 may include a main body 110 to form the outer appearance thereof, a bumper 111 mounted on the front surface of the main body 110 to mitigate impact upon collision with an obstacle, a user interface 120 mounted on the upper part of the main body 110 to receive operation information and reservation information or the like and to display operating information, and a first communicator 140 to perform communication with a recharging base 200.

The cleaning robot 100 may further include a dust collecting unit 112 provided in the vicinity of a main cleaning tool 170 on the rear side of the main body 110 to collect foreign substances such as dust collected through the main cleaning tool 170.

In addition, the cleaning robot may further include a seating portion 113 which may be formed on the upper surface of the main body 110 and on which an external device such as an imaging device 300 may be seated. That is, the seating portion 113 may be intended to prevent the external device from being moved by an external force.

The imaging device 300 may be a device to collect images around the cleaning robot and transmit the collected images to the cleaning robot. In this case, the collected images may be images for determining a movement command and a control command of the cleaning robot corresponding to the user's intention.

The cleaning robot 100 may further include an obstacle detector 150 mounted at the front, left side and right side surfaces of the main body 110 to detect an obstacle located in the forward and lateral directions of the cleaning robot.

Further, the cleaning robot 100 may include a moving assembly 160 installed at the bottom part of the main body 110 to move the main body 110, the cleaning tool 170 installed at the bottom part of the main body 110 to sweep or agitate dust on the floor and suction the swept or agitated dust, and a power supply unit 180 to supply driving power to each component. These are the same as those of the above embodiment, and a detailed description thereof will be omitted.

Figure 15:
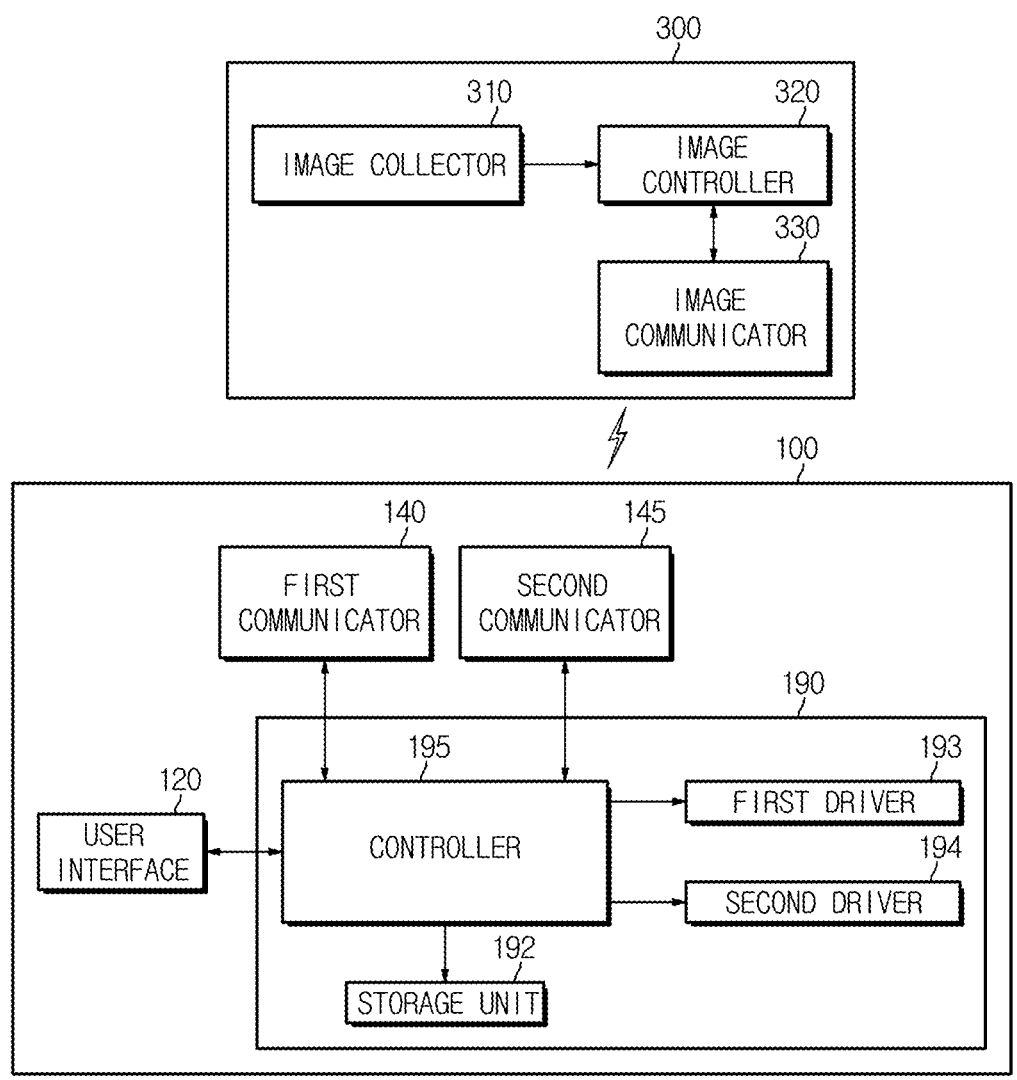
FIG. 15 is a control block diagram of a cleaning robot according to one or more embodiments.

FIG. 15 shows a control block diagram of the cleaning robot according to one or more embodiments. The cleaning robot may include the user interface 120, the first communicator 140, a second communicator 145 and a drive module 190.

The user interface 120 may receive a command from the user, and may display an operation state and the like. The user interface 120 may be implemented as a touchscreen. This user interface is the same as that of the above embodiment, and a description thereof will be omitted.

The communicator 140 may perform communication with the recharging base 200 in the docking mode, and may perform, for example, at least one of radio frequency (RF) communication, infrared communication and ultrasonic communication or the like.

The second communicator 145 may perform communication with an imaging device that is an external device. That is, the second communicator 145 may receive images transmitted from the imaging device 300 and may transmit the received images to a controller 195.

The drive module 190 may drive the user interface 120 for input and output of information and the imager 130 for an image collecting operation, and may drive the moving assembly 160 and the cleaning tool 170 based on information input to the user interface and the received images. The drive module 190 may include the controller 195, a storage unit 192 and a plurality of drivers 193 and 194.

The controller 195 may control the operations of the moving assembly 160 and the cleaning tool 170 based on an obstacle detection signal detected by the obstacle detector 150 upon determining that the cleaning mode input to the user interface 120 is the automatic mode.

The controller 195 may control the wheel motors of the moving assembly such that the cleaning robot travels in the traveling pattern input to the user interface 120 when cleaning is performed in the automatic mode. In this case, the controller 195 may control the wheel motors such that the cleaning robot travels at random, or in the traveling pattern input through the user interface 120.

The controller 195 may control the wheel motors of the moving assembly such that the cleaning robot travels while performing interaction with the user when cleaning is performed in the interactive mode. In this case, the controller 195 may control the cleaning robot to travel in the traveling pattern corresponding to the movement of the hand in the hand image in the received images, or travel while tracking the user's hand in real time.

That is, upon determining that the cleaning mode input to the user interface 120 is the interactive mode, the controller 195 may control the operations of the moving assembly 160 and the cleaning tool 170 based on the images transmitted from the imaging device 300.

In this case, the controller 195 may perform image processing of the images transmitted from the imaging device 300 to acquire a hand image, and may recognize motion of the acquired hand image. In this case, the motion may include the position of the hand and the shape of the hand.

The controller 195 may include an image processor for recognizing an image, a motion recognizer, a database, and a movement planner. These are the same as those of the above embodiment, and a description thereof will be omitted.

The controller 195 may identify the moving distance and the moving direction corresponding to the change in position of the hand, and may control driving of the wheel motors 163 and 164 based on the identified moving distance and moving direction.

If it is determined that the shape of the hand of the images transmitted from the imaging device 300 is a shape for mode change while cleaning is performed in the interactive mode, the controller 195 may change the cleaning mode to the automatic mode.

Also, if it is determined that the shape of the hand of the images transmitted from the imaging device 300 is a shape for mode change while cleaning is performed in the automatic mode, the controller 195 may change the cleaning mode from the automatic mode to the interactive mode.

Further, if the hand is not recognized in the images transmitted from the imaging device while cleaning is performed in the interactive mode, the controller 195 may halt the operations of the moving assembly and the cleaning tool to stop moving and cleaning operations, and may control output of a beep sound indicating that the hand is not recognized.

In addition, if a predetermined time has elapsed after a beep sound is output, the controller 195 may change the cleaning mode to the automatic mode.

The storage unit 192 may store the moving distance of the cleaning robot according to the moving distance of the hand.

The storage unit 192 may store a predetermined time for calculating a change in position and the like.

A first driver 193 may drive the wheel motors 163 and 164 of the moving assembly based on the command of the controller 195. In this case, the main body 110 may be rotated by setting the rotational speeds of the left and right wheel motors 163 and 164 to different values.

A second driver 194 may drive the brush motor 173 of the cleaning tool 170 based on the command of the controller 195.

The imaging device 300 is a device that may include an image sensor such as a two-dimensional camera, a three-dimensional camera and an infrared camera or the like. The imaging device 300 may include an image collector 310, an image controller 320 and an image communicator 330.

The image collector 310 may collect images around the cleaning robot. In this case, the photographing direction of the image collector 310 may be an upward direction opposite to a direction toward the floor.

The image controller 320 may control transmission of images collected by the image collector 310.

The image controller 320 may control real-time transmission of images regardless of the cleaning mode of the cleaning robot, and may control transmission of images only when the cleaning mode of the cleaning robot is the interactive mode.

That is, the images collected by the image collector may be used to recognize a control command corresponding to the user's intention when the cleaning mode is the interactive mode, and recognize the position of the cleaning robot when the cleaning mode is the automatic mode.

The image communicator 330 may transmit the images collected by the image collector 310 to the outside based on the command of the image controller 320.

Figure 16:
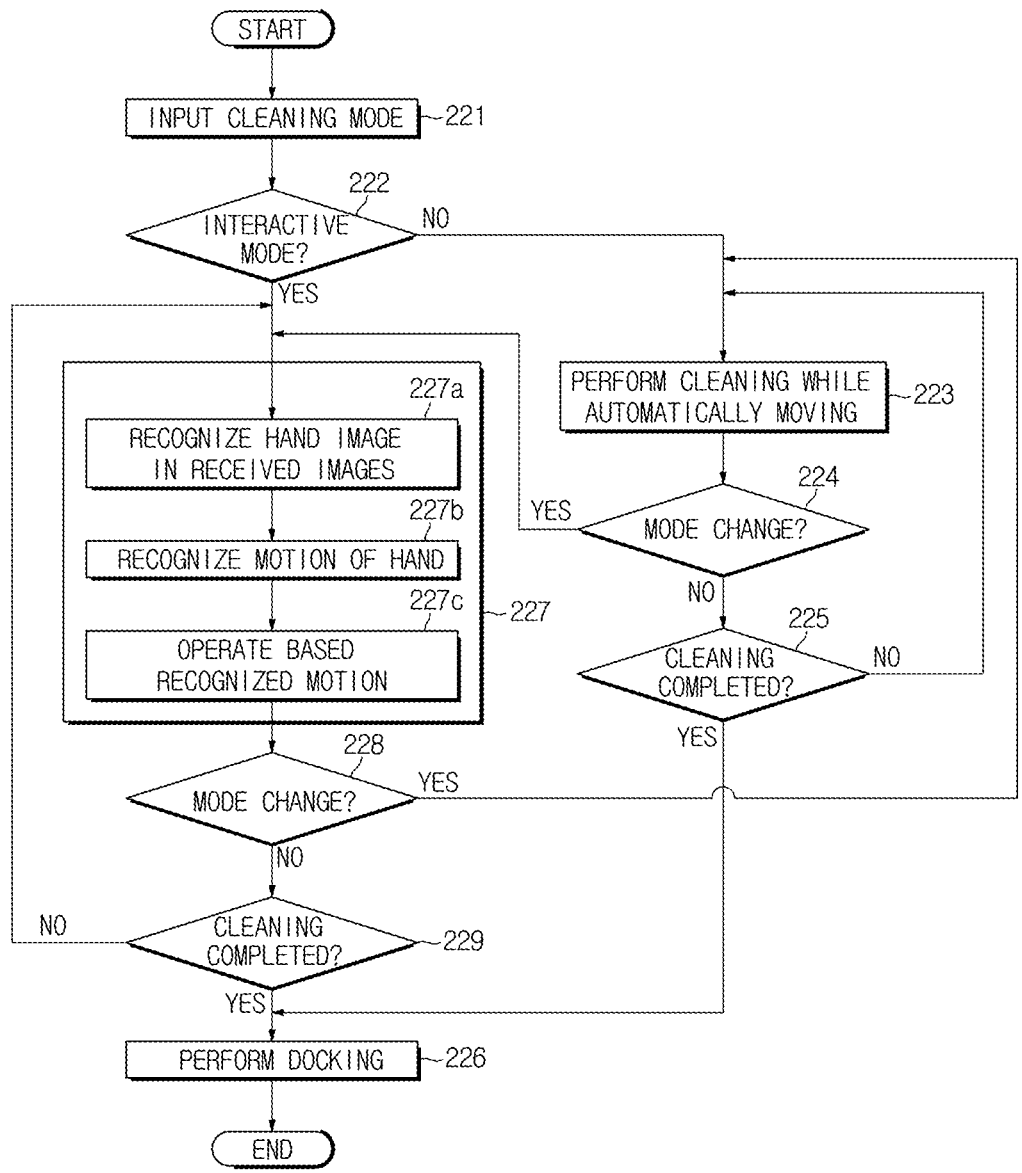
FIG. 16 is a control flowchart of a cleaning robot according to one or more embodiments.

FIG. 16 is a control flowchart of the cleaning robot according to one or more embodiments.

The cleaning robot may activate the display unit of the user interface when powered on.

The cleaning robot may receive a cleaning mode through the input unit of the user interface (operation 221).

The cleaning robot may determine whether the input cleaning mode is the interactive mode (operation 222). In this case, if the input cleaning mode is the automatic mode, the cleaning robot may perform cleaning while automatically moving about the cleaning area by driving the wheels and rotating the main brush based on an obstacle detection signal detected by the obstacle detector 150 (operation 223).

In this case, the cleaning robot may travel using preset map information, or may travel in a traveling pattern selected by the user. In addition, the cleaning robot may travel in a random manner.

The cleaning robot may determine whether a command for mode change has been input while moving about the cleaning area in the automatic mode (operation 224), and may determine whether cleaning has been completed upon determining that a command for mode change has not been input (operation 225). The cleaning robot may perform cleaning while automatically moving until completion of cleaning is determined, and may perform docking upon determining that cleaning has been completed (operation 226).

In this case, determining whether a command for mode change has been input may include determining whether the user's hand is recognized by the imaging device 300 in a state in which the cleaning robot may communicate with the imaging device 300, and determining that a command for changing the cleaning mode from the automatic mode to the interactive mode has been input upon determining that the user's hand has been recognized.

In this case, the cleaning robot may determine whether the recognized shape of the user's hand is a shape instructing mode change. Upon determining that the recognized shape of the user's hand is a shape for mode change, the cleaning robot may perform mode change.

In addition, determining whether a command for mode change has been input may further involve determining whether the interactive mode has been input to the user interface 120 during cleaning in the automatic mode, and determining that a command for changing the cleaning mode from the automatic mode to the interactive mode has been input upon determining that the interactive mode has been input to the user interface.

When the interactive mode has been input through the user interface, or the cleaning mode has been changed from the automatic mode to the interactive mode, the cleaning robot may perform communication with the imaging device 300. Upon determining that communication with the imaging device 300 is normally performed, the cleaning robot may receive the images collected by the imaging device 300 and may perform cleaning while moving based on the images collected by the imaging device 300 (operation 227).

This will be described in more detail.

When the interactive mode has been input through the user interface 120, the cleaning robot may display the traveling patterns that may be used in the interactive mode.

When the user setting pattern is selected by the user, the cleaning robot may determine whether the user's hand is recognized by the imaging device. In this case, the cleaning robot may instruct the user to set a traveling pattern through a sound or text.

Upon determining that the user's hand is recognized by the imaging device 300, the cleaning robot may track the movement of the hand. In this case, the position of the hand may be recognized at predetermined time intervals, and the traveling pattern may be set by connecting the positions recognized at predetermined time intervals.

The cleaning robot may store the set traveling pattern, and may perform cleaning while moving about the cleaning area based on the stored traveling pattern. In this case, the cleaning robot may perform cleaning while moving on a basis of a cell having a preset size.

If the real-time random pattern is selected by the user in a state in which the interactive mode is selected, the cleaning robot may receive the images transmitted from the imaging device 300 in real time, may recognize the user's hand in the received images in real time, and may perform cleaning while tracking the recognized hand (operation 227).

That is, the cleaning robot may receive the images transmitted from the imaging device 300, may recognize the hand image corresponding to the user's hand in the collected images by performing image processing of the received images (operation 227*a*), may recognize motion of the recognized hand image (operation 227*b*), and may operate based on the recognized motion (operation 227*c*).

In this case, the motion of the hand may include the shape of the hand and the position of the hand.

Since a configuration in which the cleaning robot operates based on the motion of the hand is the same as that of the above embodiment, and a description thereof will be omitted.

If the hand is not recognized in the images transmitted from the imaging device 300 while cleaning is performed in the interactive mode, the cleaning robot may stop the operations of the moving assembly and the cleaning tool to stop moving and cleaning operations, and may output a beep sound indicating that the hand is not recognized.

In addition, if a predetermined time has elapsed after a beep sound is output, the cleaning robot may change the cleaning mode to the automatic mode.

The cleaning robot may determine whether a command for mode change has been input during cleaning in the interactive mode (operation 228), may perform cleaning in the automatic mode upon determining that a command for mode change has been input, and may determine whether cleaning has been completed upon determining that a command for mode change has not been input (operation 229). The cleaning robot may perform cleaning while tracking the user's hand until completion of cleaning is determined.

In this case, determining whether a command for mode change has been input may involve determining whether the shape of the hand is a shape for mode change, and determining that the automatic mode has been input through the user interface, or the hand has not been recognized by the imaging device for a certain period of time.

If a cleaning end command or a docking command is input through the user interface, the cleaning robot may perform docking with the recharging base (operation 226), and may perform charging once docking has been completed.

In addition, the cleaning robot may perform docking with the recharging base through tracking of the user's hand.

Figure 17:
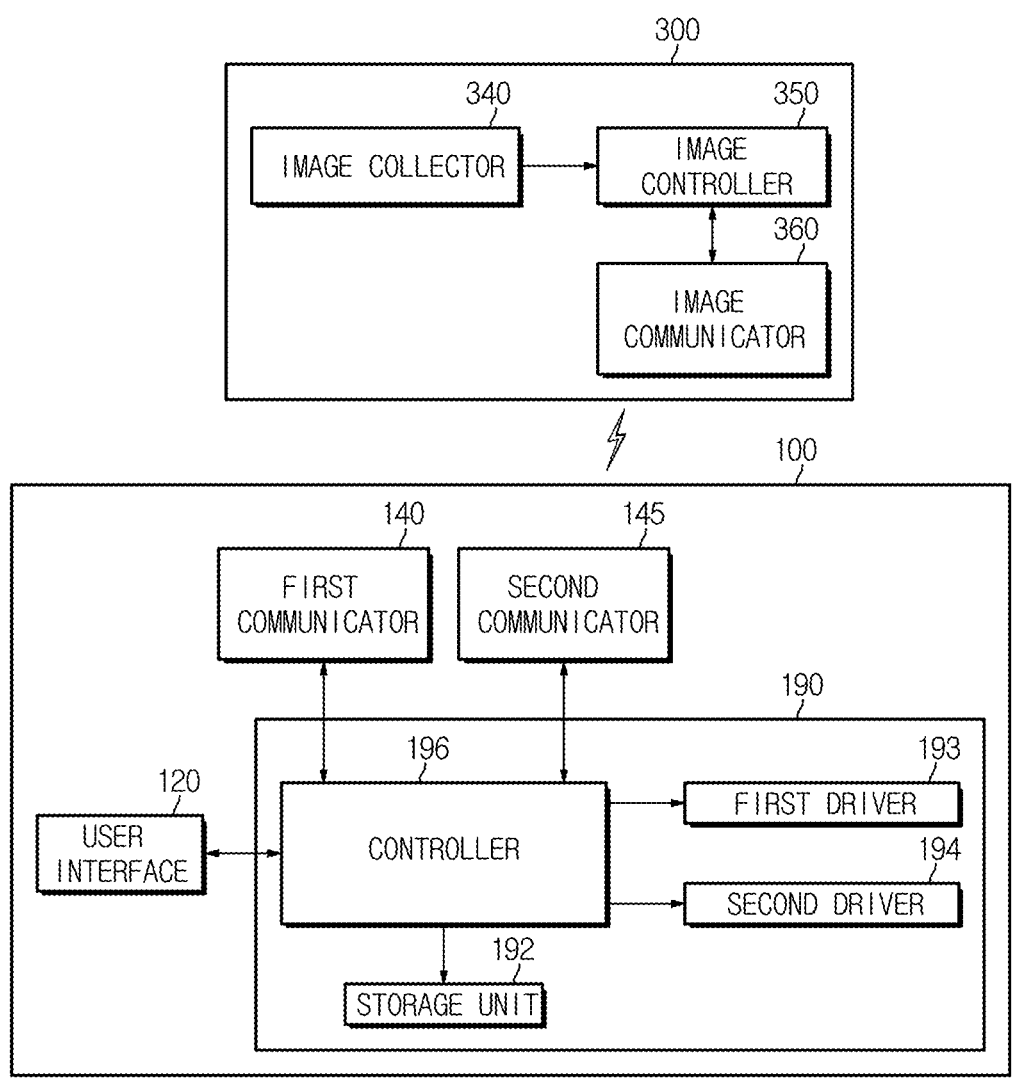
FIG. 17 is a control block diagram of a cleaning robot according to one or more embodiments.

FIG. 17 shows a control block diagram of a cleaning robot according to one or more embodiments. The cleaning robot may include a user interface 120, a first communicator 140, a second communicator 145 and a drive module 190.

First, the outer appearance of a cleaning robot 100 will be described in brief with reference to FIG. 14.

The cleaning robot 100 may include a main body 110 to form the outer appearance thereof, a bumper 111 mounted on the front surface of the main body 110 to possibly mitigate impact upon collision with an obstacle, a user interface 120 mounted on the upper part of the main body 110 to receive operation information and reservation information or the like and to display operating information, and a first communicator 140 to perform communication with a recharging base 200.

The cleaning robot 100 further may include a dust collecting unit 112 provided in the vicinity of a main cleaning tool 170 on the rear side of the main body 110 to collect foreign substances such as dust collected through the main cleaning tool 170.

In addition, the cleaning robot may further include a seating portion 113 which is formed on the upper surface of the main body 110 and on which an external device such as an imaging device 300 may be seated. That is, the seating portion 113 may prevent the external device from being moved by external force.

The imaging device 300 may be a device to collect images around the cleaning robot, recognize the hand image in the collected images, determine a movement command and a control command of the cleaning robot corresponding to the user's intention by analyzing the recognized hand image, and transmit the determined control command to the cleaning robot.

In addition, the imaging device 300 may be a mobile terminal equipped with a camera, and the mobile terminal may be a smart phone. In the case of a smart phone, the smart phone may include an application for analyzing motion of the user's hand, and transmitting a control command corresponding to the motion to the cleaning robot.

The cleaning robot 100 may further include an obstacle detector 150 mounted at the front, left side and right side surfaces of the main body 110 to detect an obstacle located in the forward and lateral directions of the cleaning robot.

Further, the cleaning robot 100 may include a moving assembly 160 installed at the bottom part of the main body 110 to move the main body 110, a cleaning tool 170 installed at the bottom part of the main body 110 to sweep or agitate dust on the floor and suction the swept or agitated dust, and a power supply unit 180 to supply driving power to each component. These are the same as those of the above embodiment, and a detailed description thereof will be omitted.

The user interface 120 may receive a command from the user, and may display an operation state and the like. The user interface 120 may be implemented, for example, as a touchscreen. This user interface is the same as that of the above embodiment, and a description thereof will be omitted.

The first communicator 140 may perform communication with the recharging base 200 in the docking mode, and may perform, for example, at least one of radio frequency (RF) communication, infrared communication and ultrasonic communication or the like.

The second communicator 145 may perform communication with the imaging device 300 that is an external device. That is, the second communicator 145 may receive a control command transmitted from the imaging device 300 and may transmit the received control command to a controller 196.

The drive module 190 may drive the user interface 120 for input and output of information, and may drive the moving assembly 160 and the cleaning tool 170 based on information input to the user interface and the received images. The drive module 190 may include the controller 196, a storage unit 192 and a plurality of drivers 193 and 194.

The controller 196 may control the operations of the moving assembly 160 and the cleaning tool 170 based on an obstacle detection signal detected by the obstacle detector 150 upon determining that the cleaning mode input to the user interface 120 is the automatic mode.

The controller 196 may control the wheel motors of the moving assembly such that the cleaning robot may travel in the traveling pattern input to the user interface 120 when cleaning is performed in the automatic mode. In this case, the controller 196 may control the wheel motors such that the cleaning robot may travel at random, or in the traveling pattern input through the user interface 120.

The controller 196 may control the operations of the moving assembly 160 and the cleaning tool 170 to correspond to the control command transmitted from the imaging device 300 when cleaning is performed in the interactive mode.

The control command may be a command for controlling the operation, which may include movement, standby, docking, stop, mode change and the like. In the case of a command for movement, the command may include information about the moving distance and moving direction.

The controller 196 may identify the moving distance and the moving direction transmitted from the imaging device, and may control driving of the wheel motors 163 and 164 based on the identified moving distance and moving direction.

If the control command transmitted from the imaging device 300 is a command for mode change while cleaning is performed in the interactive mode, the controller 196 may change the cleaning mode to the automatic mode.

If the control command transmitted from the imaging device 300 is a command for mode change while cleaning is performed in the automatic mode, the controller 196 may change the cleaning mode to the interactive mode.

The storage unit 192 may store the moving distance of the cleaning robot according to the moving distance of the hand.

A first driver 193 may drive the wheel motors 163 and 164 of the moving assembly based on the command of the controller 196. In this case, the main body 110 may be rotated by setting the rotational speeds of the left and right wheel motors 163 and 164 to different values.

A second driver 194 may drive the brush motor 173 of the cleaning tool 170 based on the command of the controller 196.

The imaging device 300 may be a device including an image sensor such as, for example, a two-dimensional camera, a three-dimensional camera and an infrared camera and the like, and may be located on the upper side of the main body.

The imaging device 300 may include an image collector 340, an image controller 350 and an image communicator 360.

The image collector 340 may collect images around the main body 110 of the cleaning robot. In this case, the photographing direction of the image collector 330 may be an upward direction opposite to a direction toward the floor.

The image controller 350 may perform image processing of the images collected by the image collector 340 to acquire a hand image, and may recognize motion of the acquired hand image. In this case, the motion may include the position of the hand and the shape of the hand.

The image controller 350 may include an image processor for recognizing an image, a motion recognizer, a database, and a movement planner. These are the same as the image processor, the motion recognizer, the database and the movement planner in the controller 191 of the above embodiment, and a description thereof will be omitted.

The image controller 350 may control transmission of the control command for the motion recognized during cleaning in the interactive mode.

The control command may be a command for controlling the operation, which may include movement, standby, docking, stop, mode change and the like. In the case of a command for movement, the command may include information about the moving distance and moving direction.

The controller 196 may identify the moving distance and the moving direction transmitted from the imaging device, and may control driving of the wheel motors 163 and 164 based on the identified moving distance and moving direction.

If it is determined that the shape of the hand of the images is a shape for mode change while cleaning is performed in the interactive mode, the image controller 350 may control transmission of a command for mode change. The image controller 350 may stop the mode of the image collector.

Also, if the hand is not recognized in the collected images while cleaning is performed in the interactive mode, the image controller 350 may control transmission of a stop command of moving and cleaning operations.

Further, the image controller 350 may control output of a beep sound informing the user that the hand is not recognized. Also, if a predetermined time has elapsed after a beep sound is output, the image controller 350 may transmit a command for mode change to the automatic mode.

The image controller 350 may control real-time transmission of images around the main body of the cleaning robot when the cleaning robot performs cleaning in the automatic mode. Also, the image controller 350 may control transmission of a control command and control the operation of the image collector to collect images only when the cleaning mode of the cleaning robot is the interactive mode.

That is, the imaging device 300 may collect images around the main body to recognize a control command corresponding to the user's intention when the cleaning mode is the interactive mode, and may collect images around the main body to recognize the position of the main body when the cleaning mode is the automatic mode, and then may transmit the collected images to the cleaning robot.

The image communicator 360 may transmit the control command to the cleaning robot 100 on the outside based on the command of the image controller 350.

Figure 18:
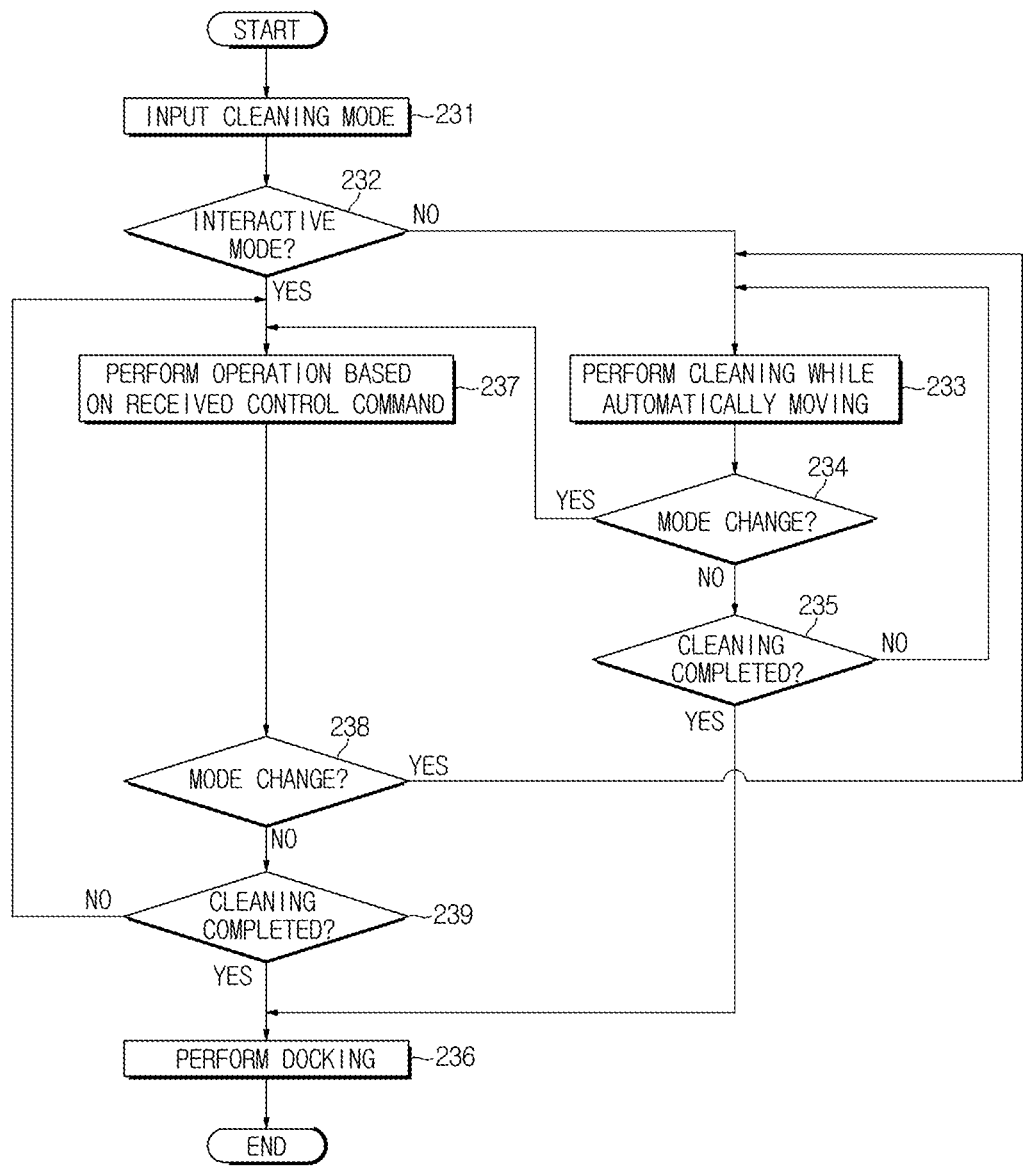
FIG. 18 is a control flowchart of a cleaning robot according to one or more embodiments.

FIG. 18 is a control flowchart of the cleaning robot according to one or more embodiments.

The cleaning robot may activate the display unit of the user interface when powered on.

The cleaning robot may receive a cleaning mode through the input unit of the user interface (operation 231).

The cleaning robot may determine whether the input cleaning mode is the interactive mode (operation 232). In this case, if the input cleaning mode is the automatic mode, the cleaning robot may perform cleaning while automatically moving about the cleaning area by driving the wheels and rotating the main brush based on an obstacle detection signal detected by the obstacle detector 150 (operation 233).

In addition, the cleaning robot may receive images around the main body from the imaging device 300 during cleaning in the automatic mode, and may travel using the images around the main body.

The cleaning robot may determine whether a command for mode change has been input while moving about the cleaning area in the automatic mode (operation 234), and may determine whether cleaning has been completed upon determining that a command for mode change has not been input (operation 235). The cleaning robot may perform cleaning while automatically moving until completion of cleaning is determined, and may perform docking upon determining that cleaning has been completed (operation 236).

In this case, determining whether a command for mode change has been input may involve determining whether a command for mode change has been input from the imaging device 300.

In this case, the imaging device may determine whether the recognized shape of the user's hand is a shape instructing mode change. Upon determining that the recognized shape of the user's hand is a shape for mode change, the imaging device may transmit a command for mode change to the cleaning robot.

In addition, determining whether a command for mode change has been input further may involve determining whether the interactive mode has been input to the user interface 120 during cleaning in the automatic mode, and determining that a command for changing the cleaning mode from the automatic mode to the interactive mode has been input upon determining that the interactive mode has been input to the user interface.

When the interactive mode has been input through the user interface, or the cleaning mode is changed from the automatic mode to the interactive mode, the cleaning robot may perform communication with the imaging device 300. Upon determining that communication with the imaging device 300 is normally performed, the cleaning robot may receive a control command from the imaging device 300 in real time, and may perform an operation based on the received control command (operation 237).

When the interactive mode has been input through the user interface 120, the cleaning robot may display the traveling patterns that may be used in the interactive mode.

When the user setting pattern is selected by the user, the cleaning robot may receive the traveling pattern set in the imaging device, may store the traveling pattern provided from the imaging device, and may perform cleaning while moving in the stored traveling pattern.

In this case, the imaging device 300 may collect images, may recognize the user's hand in the collected images, may track movement of the recognized hand, and may form the traveling pattern by connecting points in the tracked movement of the hand.

If the real-time random pattern is selected by the user in a state in which the interactive mode is selected, the cleaning robot may perform cleaning while moving based on the control command transmitted from the imaging device 300 (operation 237).

The control command during movement may include information about the moving distance and moving direction.

The cleaning robot may perform a stop operation upon receiving a stop command from the imaging device 300 while performing cleaning in the interactive mode, may perform a docking operation upon receiving a docking command from the imaging device 300, and may perform mode change to a mode different from the current cleaning mode upon receiving a command for mode change from the imaging device 300.

The cleaning robot may determine whether a command for mode change has been input during cleaning in the interactive mode (operation 238), may perform cleaning in the automatic mode upon determining that a command for mode change has been input, and may determine whether cleaning has been completed upon determining that a command for mode change has not been input (operation 239). The cleaning robot may perform cleaning while tracking the user's hand until completion of cleaning.

In this case, determining whether a command for mode change has been input may involve determining whether a command for mode change has been input from the imaging device, and determining whether the automatic mode has been input through the user interface.

If a cleaning end command or a docking command is input through the user interface, the cleaning robot may perform docking with the recharging base (operation 236), and may perform charging once docking has been completed.

In addition, the cleaning robot may perform docking with the recharging base through tracking of the user's hand.

As described above, it may be possible to perform cleaning using less physical force by applying interaction technology to the cleaning robot. Also, since the cleaning robot may be moved according to the user's intension, it may be possible to reduce the user's labor, improve the user's satisfaction, and provide an intuitive interface.

In addition, the cleaning mode may be easily changed using motion of the user's hand.

The technology of this cleaning robot also may be extensively applied to other moving means such as lawn mowers and wheelchairs.

Figure 19:
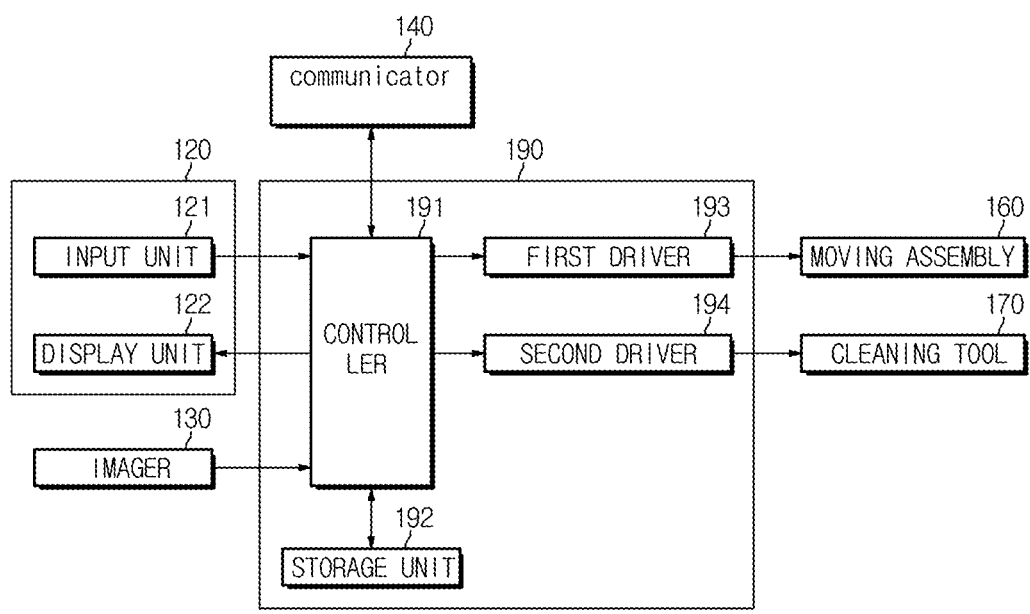
FIG. 19 is a control block diagram of a cleaning robot according to one or more embodiments.

FIG. 19 shows a control block diagram of a cleaning robot according to one or more embodiments. The cleaning robot may include a user interface 120, an imager 130, a communicator 140 and a drive module 190.

The user interface 120 may receive a command from the user, and may display an operation state and the like.

The user interface 120 may include an input unit 121 to receive cleaning reservation information, cleaning start/end, an operation mode, a traveling pattern and the like, and a display unit 122 to display cleaning reservation information, a charging state, a dust collecting state, a traveling pattern, an operation mode and the like.

In this case, the operation mode may include a cleaning mode having the automatic mode and the interactive mode, a standby mode, a docking mode and the like.

The user interface 120 may be implemented, for example, as a touchscreen.

The imager 130 may collect images around the main body 110. In this case, the photographing direction of the imager 130 may be an upward direction opposite to a direction toward the floor.

The imager 130 may be oriented in the forward direction of the cleaning robot in the traveling direction.

The imager 130 may include, for example, a two-dimensional camera, a three-dimensional camera, an infrared camera or the like.

The imager 130 may collect images around the main body to obtain a control command when the cleaning mode is the interactive mode, and may collect images around the main body to detect an obstacle and position information of the main body when the cleaning mode is the automatic mode.

That is, the images collected when the cleaning mode is the interactive mode may be images of the user's hand and images around the hand. The images of the user's hand may be used to recognize the control command corresponding to the intention of the user, and the images around the hand may be used to recognize the position of the main body. The images collected when the cleaning mode is the automatic mode may be images around the main body, and may be used to recognize an obstacle and the position of the cleaning robot.

The communicator 140 may perform communication with the recharging base 200 in the docking mode, and may perform, for example, at least one of radio frequency (RF) communication, infrared communication and ultrasonic communication or the like.

Further, the communicator 140 may perform communication with a remote control (not shown) for manipulating the operation of the cleaning robot.

The cleaning robot 100 may include the obstacle detector 150 mounted on the main body 110 to detect an obstacle in the cleaning area.

The cleaning robot 100 may generate a map by using information about images collected by the imager 130 and detection information of an obstacle detected by the obstacle detector 150, and may perform traveling by using the map generated in the automatic mode.

The drive module 190 may drive the user interface 120 for input and output of information and the imager 130 for an image collecting operation, and may drive the moving assembly 160 and the cleaning tool 170 based on information input to the user interface 120 and images collected by the imager 130. The drive module 190 may include a controller 197, a storage unit 192 and a plurality of drivers 193 and 194.

The controller 197 may control operations of the moving assembly 160 and the cleaning tool 170 based on images collected by the imager 130 and an obstacle detection surface detected by the obstacle detector 150 upon determining that the cleaning mode input to the user interface 120 is the automatic mode.

The controller 197 may control the moving assembly 160 to perform traveling while performing interaction with the user when cleaning is performed in the interactive mode.

In this case, the cleaning robot may travel in the traveling pattern corresponding to the movement of the hand in the hand images collected by the imager 130, travel while tracking the user's hand in real time, or travel directly to the area corresponding to the number of fingers.

In this case, the controller 197 may perform image processing of the images collected by the imager 130 to acquire a hand image, and may recognize motion of the acquired hand image. In this case, the motion may include the position of the hand and the shape of the hand.

The controller 197 may recognize a control command corresponding to the shape of the hand, and may control the operation of at least one of the moving assembly 160 and the cleaning tool 170 to perform the recognized control command.

The controller 197 may recognize the number of unfolded fingers in the shape of the hand when recognizing the control command, may determine an area corresponding to the number of the recognized fingers, and may control the moving assembly 160 to move to the determined area. Further, the controller 197 may stop the operation of the cleaning tool 170 during movement of the main body.

The controller 197 may perform cleaning in the automatic mode upon completion of the movement to the determined area, or control at least one of traveling and cleaning operations based on motion of the recognized hand upon recognition of the user's hand.

Further, the controller 197 may determine whether the shape of the hand is a shape for setting up a virtual wall when recognizing the control command, may perform position recognition from a start position to an end position at which the shape of the hand for setting up a virtual wall is recognized upon determining that the shape of the hand is a shape for setting up a virtual wall, sets and may store the recognized positions as virtual wall positions, and may control the operation of the moving assembly 160 such that the main body does not move to the set virtual wall positions.

The controller 197 may acquire movement information such as a moving direction and a moving distance of the moving assembly from the start position to the end position at which the shape of the hand for setting up a virtual wall is recognized when setting up a virtual wall, and may set virtual wall positions in the cleaning area by applying the acquired movement information to map information.

Further, the controller 197 may acquire images around the hand from the start position to the end position at which the shape of the hand is recognized when setting up a virtual wall, collect feature image information in the acquired images around the hand, and set positions having feature image information as the virtual wall positions.

The controller 197 may control the cleaning tool 170 such that cleaning is performed while controlling the moving assembly so as not to move to the set virtual wall positions.

In the same way as in the above embodiment, the controller 197 may recognize the shape of the hand in the hand images, identify a control command corresponding to the recognized shape of the hand, and perform an operation, such as standby and docking, corresponding to the identified control command.

The storage unit 192 may store information about reference images corresponding to shapes of the hand, and may store control commands corresponding to the shapes of the hand, respectively.

The storage unit 192 may store the moving distance of the cleaning robot according to the moving distance of the hand.

The storage unit 192 may store information about the hand shapes corresponding to a plurality of positions, respectively, and store a moving path between the positions. In this case, each of the plurality of positions may be a room or space of the cleaning area.

For example, the storage unit 192 may store room names corresponding to the shapes according to the number of fingers of the hand, for example, Room 1 if the shape of the hand is a shape in the case of unfolding one finger, Room 2 if the shape of the hand is a shape in the case of unfolding two fingers, Room 3 if the shape of the hand is a shape in the case of unfolding three fingers, and Room 4 if the shape of the hand is a shape in the case of unfolding four fingers.

Further, the storage unit 192 may store map information, and also may store the position of the virtual wall on the map information.

Further, the storage unit 192 may store image information corresponding to the position of the virtual wall.

A first driver 193 may drive the wheel motors 163 and 164 of the moving assembly 160 based on the command of the controller 197. In this case, the main body 110 may be rotated by setting the rotational speeds of the left and right wheel motors 163 and 164 to different values.

A second driver 194 may drive the brush motor 173 of the cleaning tool 170 based on the command of the controller 197.

Figure 20:
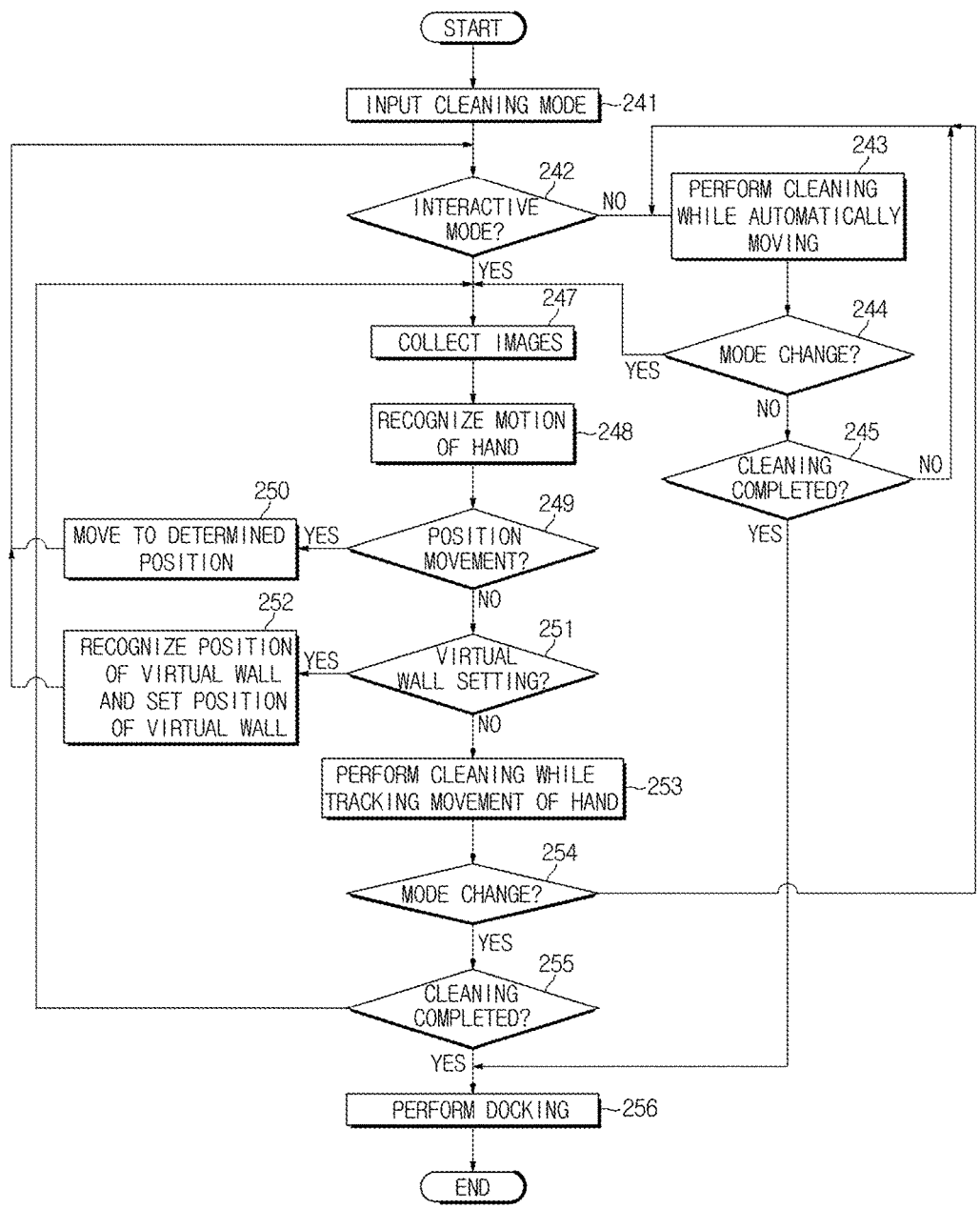
FIG. 20 is a control flowchart of a cleaning robot according to one or more embodiments.

FIG. 20 is a control flowchart of the cleaning robot according to one or more embodiments.

The cleaning robot may activate the display unit 122 of the user interface when powered on.

The cleaning robot may receive a cleaning mode through the input unit of the user interface (operation 241).

The cleaning robot may determine whether the input cleaning mode is the interactive mode (operation 242). If it is determined that the input cleaning mode is the automatic mode, the cleaning robot may perform cleaning while automatically moving about the cleaning area by driving the wheels and rotating the main brush based on an obstacle detection signal detected by the obstacle detector 150 (operation 243).

The cleaning robot may determine whether a command for mode change has been input while moving about the cleaning area in the automatic mode (operation 244), and may determine whether cleaning has been completed upon determining that a command for mode change has not been input (operation 245). The cleaning robot may perform cleaning while automatically moving until completion of cleaning is determined, and may stop the cleaning tool and may perform docking with the recharging base upon determining that cleaning has been completed (operation 246).

If the interactive mode has been input through the user interface, or the cleaning mode is changed from the automatic mode to the interactive mode, the cleaning robot may collect images through the imager 130 (operation 247), may recognize motion of the hand in the collected images (operation 248), and may perform at least one of moving and cleaning operations based on the recognized motion of the hand. In this case, the motion of the hand may include the shape of the hand and the position of the hand.

A configuration in which the cleaning robot may operate based on the motion of the hand will be described in more detail.

The cleaning robot may recognize the shape of the hand based on the hand image, and may generate image information corresponding to the shape of the hand.

Then, the cleaning robot may recognize the shape of the hand in the currently generated image information by comparing the generated image information of the shape of the hand with the information about reference images corresponding to shapes stored in the storage unit 192, may identify a control command corresponding to the recognized shape of the hand.

The cleaning robot may determine whether the identified control command is a position moving command (operation 249).

That is, if it is determined that the recognized shape of the hand is a shape corresponding to any one position, the cleaning robot may determine that the identified control command is a position moving command, may identify a position corresponding to the recognized shape of the hand, and may move to the identified position (operation 250).

This will be described with reference to FIG. 21.

Figure 21:
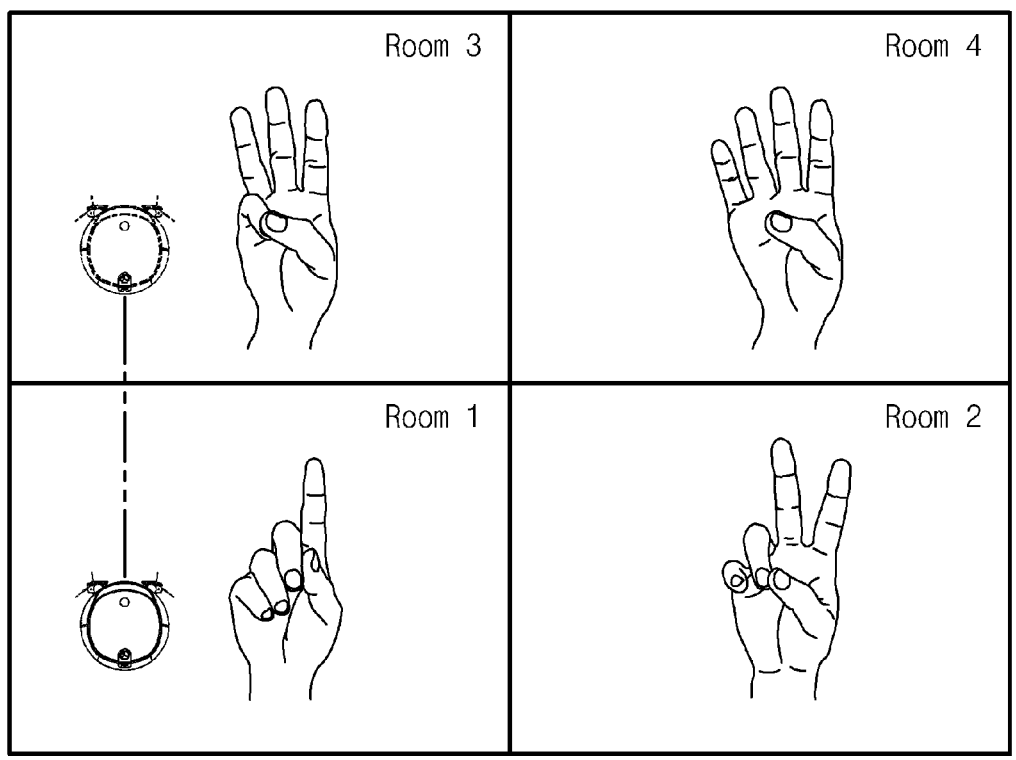
FIG. 21 is an exemplary diagram of position movement of a cleaning robot according to one or more embodiments.

As shown in FIG. 21, in a state of storing room names corresponding to the shapes according to the number of fingers of the hand, for example, Room 1 if the shape of the hand is a shape in the case of unfolding one finger, Room 2 if the shape of the hand is a shape in the case of unfolding two fingers, Room 3 if the shape of the hand is a shape in the case of unfolding three fingers, and Room 4 if the shape of the hand is a shape in the case of unfolding four fingers, upon determining that the recognized shape of the hand is a shape in the case of unfolding three fingers, the cleaning robot may determine that the control command is a position moving command, and may perform movement from Room 1 corresponding to the current position to Room 3.

In this case, the cleaning robot may move from Room 1 to Room 3 based on map information and a moving path between positions.

The cleaning robot may determine whether the hand is present in the collected images upon completion of movement to the identified position, and may perform cleaning while tracking movement of the hand if the hand is present in the collected images.

Further, upon determining that the hand is not present in the collected images, the cleaning robot may perform cleaning while automatically moving after changing the cleaning mode to the automatic mode.

Upon determining that the control command is not a position moving command, the cleaning robot may determine whether the recognized shape of the hand is a shape for setting up a virtual wall (operation 251).

That is, the cleaning robot may determine whether the control command is a command for setting up a virtual wall. Upon determining that the control command is a command for setting up a virtual wall, the cleaning robot may set, as virtual wall positions, a start position at a start point of recognition of the shape of the hand for setting up a virtual wall to an end position at an end point of recognition of the shape of the hand for setting up a virtual wall (operation 252).

This will be described with reference to FIG. 22. Further, the shape of the hand corresponding to the command for setting up a virtual wall may be a shape of a fist shaking for a predetermined period of time.

Figure 22:
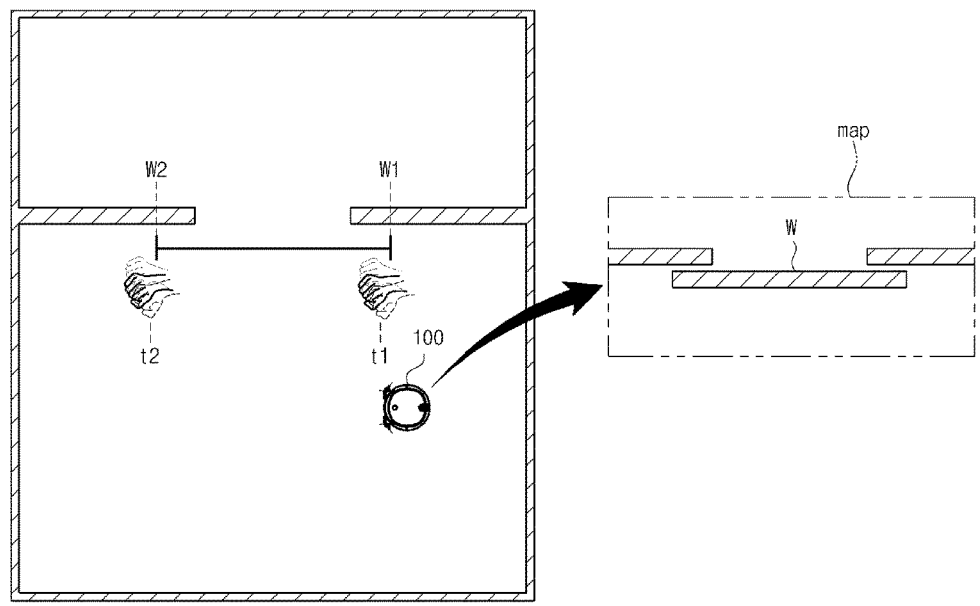
FIG. 22 is an exemplary diagram of virtual wall setting of a cleaning robot according to one or more embodiments.

As shown in FIG. 22, upon determining whether the recognized shape of the hand is a shape in the case of clenching a fist, the cleaning robot may determine whether the shape of the fist is shaken for a predetermined period of time.

Then, upon determining that the shape of the fist has been shaken for a predetermined period of time, the cleaning robot may determine that the control command is a command for setting up a virtual wall, may recognize a position at a time point t1 when the shape of the fist has been shaken for a predetermined period of time as a start position W1, and continuously may track the shape of the hand, i.e., the shape of the fist.

Then, the cleaning robot may determine whether the shape of the fist is shaken for a predetermined period of time while continuously tracking the hand having the shape of the fist. Upon determining that the shape of the fist has been shaken for a predetermined period of time during tracking, the cleaning robot may recognize a position at a time point t2 when the shape of the fist has been shaken for a predetermined period of time as an end position W2, and sets a virtual wall by connecting the start position W1 to the end position W2.

Alternatively, a position at a time point when the hand is stopped during tracking may be recognized as an end position.

Upon completion of setting up a virtual wall, the cleaning robot may store a position of the virtual wall. In this case, the cleaning robot may match position information of the virtual wall to map information.

Further, the cleaning robot may store image information collected at the position of the virtual wall.

Then, the cleaning robot may perform cleaning while bypassing the virtual wall.

That is, the cleaning robot may determine whether the hand is present in the collected images. If the hand is present in the collected images, the cleaning robot may perform cleaning while tracking movement of the hand. If a moving position is the position of the virtual wall, the cleaning robot may travel while bypassing the virtual wall to avoid the virtual wall.

Upon determining that the hand is not present in the collected images, the cleaning robot may change the cleaning mode to the automatic mode, and perform cleaning while automatically moving. In this case, if a moving position is the position of the virtual wall, the cleaning robot may travel while bypassing the virtual wall to avoid the virtual wall.

On the other hand, upon determining that the control command is not a command for setting up a virtual wall, the cleaning robot may perform cleaning while tracking the position of the hand in real time (operation 253).

Further, the cleaning robot may perform an operation corresponding to a control command other than a position moving command and a command for setting up a virtual wall before performing cleaning while tracking the position of the hand in real time.

For example, if the recognized shape of the hand is a shape in the case of clenching a fist, the cleaning robot may halt driving of the wheel motors and the brush motor to stop the main body. If the recognized shape of the hand is a shape in the case of shaking the hand for a predetermined period of time in a state of spreading five fingers, the cleaning robot may drive the wheel motors and may halt driving of the brush motor to perform docking.

Then, the cleaning robot may determine whether a command for mode change has been input during cleaning in the interactive mode (operation 254), may perform cleaning in the automatic mode upon determining that a command for mode change has been input, and may determine whether cleaning has been completed upon determining that a command for mode change has not been input (operation 255). The cleaning robot may perform cleaning while tracking the user's hand until completion of cleaning.

Further, if the hand is not recognized in the images collected by the imager 130 while cleaning is performed in the interactive mode, the cleaning robot may stop the operations of the moving assembly and the cleaning tool to stop moving and cleaning operations, and output a beep sound indicating that the hand is not recognized. In this case, if a predetermined time has elapsed after a beep sound is output, the cleaning robot may change the cleaning mode to the automatic mode.

If a cleaning end command or a docking command is input through the user interface, the cleaning robot may perform docking with the recharging base (operation 246), and may perform charging once docking is completed.

In addition, the cleaning robot may perform docking with the recharging base through tracking of the user's hand.

As described above, it may be possible to achieve fast and easy space movement by performing position movement based on the shape of the hand. Also, it may be possible to eliminate a beacon for setting up a virtual wall by setting up a virtual wall based on the shape of the hand, and the cost may be reduced.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A cleaning robot comprising:
   a main body;
   a moving assembly to move the main body;
   a cleaning tool provided at a bottom part of the main body to collect foreign substances on a floor;
   an imager to collect images around the main body; and
   a controller to recognize a marker in the collected images, identify a change in position of the marker, plan moving information including a moving direction of the main body and a moving distance of the main body based on the identified change in position, and control operations of the moving assembly and the cleaning tool based on the planned movement information,
   wherein when a virtual wall setting command has been input, the controller:
      recognizes a start position at a start point and an end position at an end point based on an identified change in position for setting up a virtual wall; and
      sets up the virtual wall by connecting the start position to the end position based on the identified change in position.

2. The cleaning robot according to claim 1, wherein the controller determines a moving speed of the marker based on a time and the moving distance, and controls a moving speed of the main body based on the determined moving speed of the marker.

3. The cleaning robot according to claim 1, wherein the controller controls the moving assembly such that the main body moves autonomously if the marker is not recognized in the collected images.

4. The cleaning robot according to claim 1, wherein the controller controls the moving assembly to move the main body forward if the marker moves forward, controls the moving assembly to move the main body backward if the marker moves backward, and controls the moving assembly to rotate the main body if the marker rotates.

5. The cleaning robot according to claim 1, wherein the controller controls movement of the main body based on a same distance as a moving distance of the marker, and controls movement of the main body in a same direction as a moving direction of the marker.

6. The cleaning robot according to claim 1, wherein if a traveling pattern setting command has been input, the controller recognizes positions of the marker over time, and sets a traveling pattern by connecting the recognized positions.

7. A method for controlling a cleaning robot having a moving assembly and a cleaning tool provided at a bottom part of a main body, comprising:
   collecting images around the main body by using an imager;
   recognizing a marker in the collected images;
   recognizing motion of the marker in the collected images;
   planning movement information including a moving direction of the main body and a moving distance of the main body based on the motion of the marker; and
   controlling operations of the moving assembly and the cleaning tool based on the planned movement information,
   wherein when a virtual wall setting command has been input:
      recognizing a start position at a start point and an end position at an end point based on an identified change in position for setting up a virtual wall; and
      setting up the virtual wall by connecting the start position to the end position based on the identified change in position.

8. The method according to claim 7, wherein the marker is provided in a square shape attached to a hand of the user.

9. The method according to claim 7, further comprising:
   tracking positions of the marker in the collected images at predetermined time intervals;
   setting a traveling pattern by connecting the tracked positions of the marker in the collected images; and
   controlling movement of the moving assembly based on the set traveling pattern.

10. The method according to claim 7, wherein the marker matches a predefined marker image.

11. The method according to claim 10, wherein the planning of the moving direction and the moving distance of the main body comprises:
   recognizing the predefined marker image in the collected images;
   identifying a change in position of the recognized marker image; and
   planning the moving direction and the moving distance of the main body based on the identified change in position.

* * * * *